(12) United States Patent
Karpistsenko et al.

(10) Patent No.: US 11,172,045 B2
(45) Date of Patent: Nov. 9, 2021

(54) SPATIO-TEMPORAL DATA PROCESSING SYSTEMS AND METHODS

(71) Applicant: Intertrust Technologies Corporation, Sunnyvale, CO (US)

(72) Inventors: Andre Karpistsenko, Tallinn (EE); Rainer Sternfeld, Palo Alto, CA (US); Kalle Kagi, Tallinn (EE); Oleg Murk, Tartu (EE); Rando Valt, Tallinn (EE); Roberto Antonio Ferreira De Almeida, Sunnyvale, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 23 days.

(21) Appl. No.: 16/460,940

(22) Filed: Jul. 2, 2019

(65) Prior Publication Data

US 2019/0324972 A1    Oct. 24, 2019

Related U.S. Application Data

(63) Continuation of application No. 15/642,277, filed on Jul. 5, 2017, now Pat. No. 10,372,721, which is a (Continued)

(51) Int. Cl.
*H04L 29/08* (2006.01)
*H04L 29/06* (2006.01)
(Continued)

(52) U.S. Cl.
CPC .......... *H04L 67/2885* (2013.01); *G06F 16/25* (2019.01); *G06Q 10/06* (2013.01);
(Continued)

(58) Field of Classification Search
CPC ..... H04L 67/12; H04L 67/2885; G06Q 10/06; G06Q 10/0637
See application file for complete search history.

(56) References Cited

U.S. PATENT DOCUMENTS

| 5,568,450 A | 10/1996 | Grande |
| 6,985,929 B1 | 1/2006 | Wilson |

(Continued)

OTHER PUBLICATIONS

U.S. Appl. No. 14/095,752, Office Action dated Oct. 4, 2016 (12 pgs).

(Continued)

*Primary Examiner* — Kyung H Shin
(74) *Attorney, Agent, or Firm* — John P. Davis; Thayne and Davis LLC

(57) ABSTRACT

This disclosure relates to systems and methods for collecting, integrating, processing, distributing, and analyzing spatial and/or spatio-temporal information associated with a variety of data sources and/or locations. In some embodiments, systems and methods described herein allow for collection and integration of information included in one or more spatial and/or spatio-temporal data streams and/or other related information that may be utilized in connection with one or more analytical processes. In certain embodiments, the disclosed embodiments may allow a user to, among other things, interact with spatio-temporal information associated with a variety of diverse data sources, generate visualizations using such data, and/or perform desired analytical queries based on the data.

16 Claims, 17 Drawing Sheets

Related U.S. Application Data continuation of application No. 14/095,752, filed on Dec. 3, 2013, now Pat. No. 9,734,220.

(60) Provisional application No. 61/732,957, filed on Dec. 4, 2012, provisional application No. 61/792,537, filed on Mar. 15, 2013.

(51) Int. Cl.

| | |
|---|---|
| *G06F 16/25* | (2019.01) |
| *G06Q 50/02* | (2012.01) |
| *G06Q 50/28* | (2012.01) |
| *G06Q 10/06* | (2012.01) |
| *G01V 99/00* | (2009.01) |
| *H04N 21/231* | (2011.01) |
| *H04N 21/84* | (2011.01) |
| *H04N 21/845* | (2011.01) |

(52) U.S. Cl.
CPC ............. *G06Q 50/02* (2013.01); *G06Q 50/28* (2013.01); *H04L 29/06027* (2013.01); *G01V 99/00* (2013.01); *G01V 2210/70* (2013.01); *G06Q 10/0637* (2013.01); *H04L 67/12* (2013.01); *H04N 21/23109* (2013.01); *H04N 21/84* (2013.01); *H04N 21/8456* (2013.01)

(56) References Cited

U.S. PATENT DOCUMENTS

| | | | |
|---|---|---|---|
| 8,032,508 | B2 | 10/2011 | Martinez |
| 8,041,517 | B2 | 10/2011 | Thayer |
| 8,170,392 | B2 | 5/2012 | Rakib |
| 8,856,167 | B2 | 10/2014 | Higgins |
| 9,075,883 | B2 * | 7/2015 | Verkasalo ............... G06Q 10/06 |
| 9,734,220 | B2 | 8/2017 | Karpistsenko |
| 10,230,803 | B2 | 3/2019 | Higgins |
| 2006/0233247 | A1 | 10/2006 | Visharam |
| 2007/0195712 | A1 | 8/2007 | Thayer |
| 2008/0104123 | A1 | 5/2008 | Kaneko |
| 2009/0129755 | A1 | 5/2009 | Rakib |
| 2010/0054526 | A1 | 3/2010 | Eckles |
| 2012/0197856 | A1* | 8/2012 | Banka ................. H04L 67/2885 707/706 |
| 2014/0007017 | A1 | 1/2014 | Sternfeld |

OTHER PUBLICATIONS

U.S. Appl. No. 14/095,752, Notice of Allowance dated Apr. 27, 2017 (5 pgs).

U.S. Appl. No. 15/642,277, Notice of Allowance dated Mar. 27, 2019 (7 pgs).

* cited by examiner

SPATIO-TEMPORAL DATA PROCESSING SYSTEMS AND METHODS

RELATED APPLICATIONS

This application is a continuation of patent application Ser. No. 15/642,277, filed on Jul. 5, 2017, and titled "SPATIO-TEMPORAL DATA PROCESSING SYSTEMS AND METHODS," which claims the benefit of priority under 35 U.S.C. § 119(e) to U.S. Provisional patent application Ser. No. 14/095,752, filed on Dec. 3, 2013, and titled "SPATIO-TEMPORAL DATA PROCESSING SYSTEMS AND METHODS," which claims the benefit of priority under 35 U.S.C. § 119(e) to U.S. Provisional Patent Application No. 61/732,957, filed Dec. 4, 2012, and entitled "COLLABORATIVE ANALYTICS FOR SPATIO-TEMPORAL DATA", and to U.S. Provisional Patent Application No. 61/792,537, filed Mar. 15, 2013, and entitled "SPATIO-TEMPORAL DATA PLATFORM". The entire contents of each of the foregoing applications are incorporated herein by reference.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The present disclosure relates generally to systems and methods for processing spatio-temporal data. More specifically, but not exclusively, the present disclosure relates to spatio-temporal data collection, integration, processing, distribution, protocols, and analytics.

BACKGROUND

Measuring and/or modeling of dynamic environments including, for example, planetary bodies of water and/or liquid, layers of gases surrounding material bodies of sufficient mass, and/or solid shells of a rocky planet and/or natural satellite and/or minor planets, may generate spatial, temporal, and/or spatio-temporal data streams associated with large volumes of data. Conventional spatial information systems may be highly specialized for a specific data source, organization, and/or location, and thus may not be suitable for use in connection with a variety of data sources, organizations, and/or locations. For example, conventional spatial information systems utilizing oceanographic, climatological, atmospheric, and seismic data may not be capable of providing global cross-organization solutions that integrate and provide efficient access to diverse datasets. Conventional systems may further provide limited means for interacting with and/or exploring temporal aspects of information, and may be similarly limited in terms of ability to leverage value from available diverse datasets and/or control devices measuring the environment.

SUMMARY

Embodiments of the systems and methods disclosed herein may be utilized in connection with the collection, integration, management, processing, analysis, distribution, access, interaction with, and/or visualization of spatial and/or spatio-temporal data associated with a variety of data sources, organizations, and/or locations. Data-intensive services interacting with an environment may collect, process, and/or apply data produced by a variety of sensors in different space-time regions. Diverse sets of hardware, data formats, data protocols, computer clusters, software packages/frameworks and organizations may be involved from the time a measurement is made to the time of using the data or derived data products. Complex behavior arising from interactions between the involved components and parties benefits from systems and methods of monitoring, exploring, analyzing, processing, optimizing, orchestrating and controlling the flow of data between sensors and applications.

Working across different physical locations and time windows with diverse spatio-temporal datasets may involve a variety of systems, tools and/or people. Time and resources spent on discovering, transferring, processing, analyzing, creating, improving and sharing intermediate and final work results in the form of data, code, algorithms, models, statistics, visualizations, related documents and discussions, are some of the factors determining the efficiency of data analytics and the impact of resulting decisions by people and systems based on such analytics. The growth of spatio-temporal data across industries, together with the growth of complexity of systems, may benefit from data protocols and systems and methods for virtual collaboration.

Embodiments of the systems and methods disclosed herein may enable access, interaction, and/or visualization of spatial and/or spatio-temporal data associated with a variety of data sources, organizations, and/or locations. In some embodiments, systems and methods described herein allow for interactive visualization of information included in one or more spatial and/or spatio-temporal data streams and/or other related information using an interface of a visual explorer system. Further embodiments enable collaborative data analytics of spatio-temporal data across different physical locations and time windows.

In certain embodiments, the disclosed systems and methods allow integration of a variety of tools and systems with a visual explorer system via common data protocols. Time and resource usage may be optimized by managing and unifying diverse datasets, integrating prior and ongoing work results in the visual explorer and a document repository for reuse and enhancement. Further embodiments enable integration of diverse, distributed systems for collecting, processing and applying data and related metadata via a spatio-temporal data platform that may support, among other things, a variety of different data types, structuring of data for responsive data processing, cleaning and transforming data to meet specific data quality and consistency criteria; extensible data integration protocols and dataflows, involvement of groups of people into various steps of processing and system development, and/or the like.

Embodiments of the systems and methods disclosed herein may allow for integration, processing, and/or analysis of data in a way that may be utilized in a variety of applications in connection with a variety of Earth and planetary science related industries. For example, embodiments may be used in connection with sustainable investment decisions or operations of ocean-related industries like offshore oil and gas exploration, deep-sea mining, transportation of goods via ships, insurance of ocean-based operations, energy production with wind farms, defense and homeland security, fishing and aquaculture, and/or the like.

Further embodiments may be used in domains related to climatology, meteorology, land cover/use, geology, satellite operations, space exploration, agriculture automation and operations, and/or any other suitable application.

Data analysis performed using embodiments of the systems and methods disclosed herein may be used in connection with human-based decision making. In yet further embodiments, data analyzed using the disclosed embodiments by a control system in connection with automated decision making. Embodiments of the systems and methods disclosed herein may be implemented in a variety of suitable configurations that, in some embodiments, may be specific to a particular application.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, where in some instances, like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the systems and methods disclosed herein may be utilized in connection with the collection, integration, management, processing, analysis, distribution, access, interaction with, and/or visualization of spatial and/or spatio-temporal data associated with a variety of data sources and/or locations. In certain embodiments, systems and methods disclosed herein may be utilized in connection with one or more Earth sciences related data streams, although other suitable types of information may also be used. For example, systems and methods disclosed herein may be utilized in connection with spatial and/or spatio-temporal data relating to the Earth's oceans, atmosphere, surface of another planet or satellite, orbits around a planet for artificial and natural satellites, climate, seismic activity, and/or the like. As used herein, the terms spatial data, spatio-temporal data, geospatial data, information, data, datasets, and/or data stream may be used interchangeably. Systems and methods disclosed herein may allow for interactive visualization of information included in one or more spatial and/or spatio-temporal data streams and/or other related information using an interface of a visual explorer system.

Spatio-Temporal Data Ecosystem Overview

Figure 1:
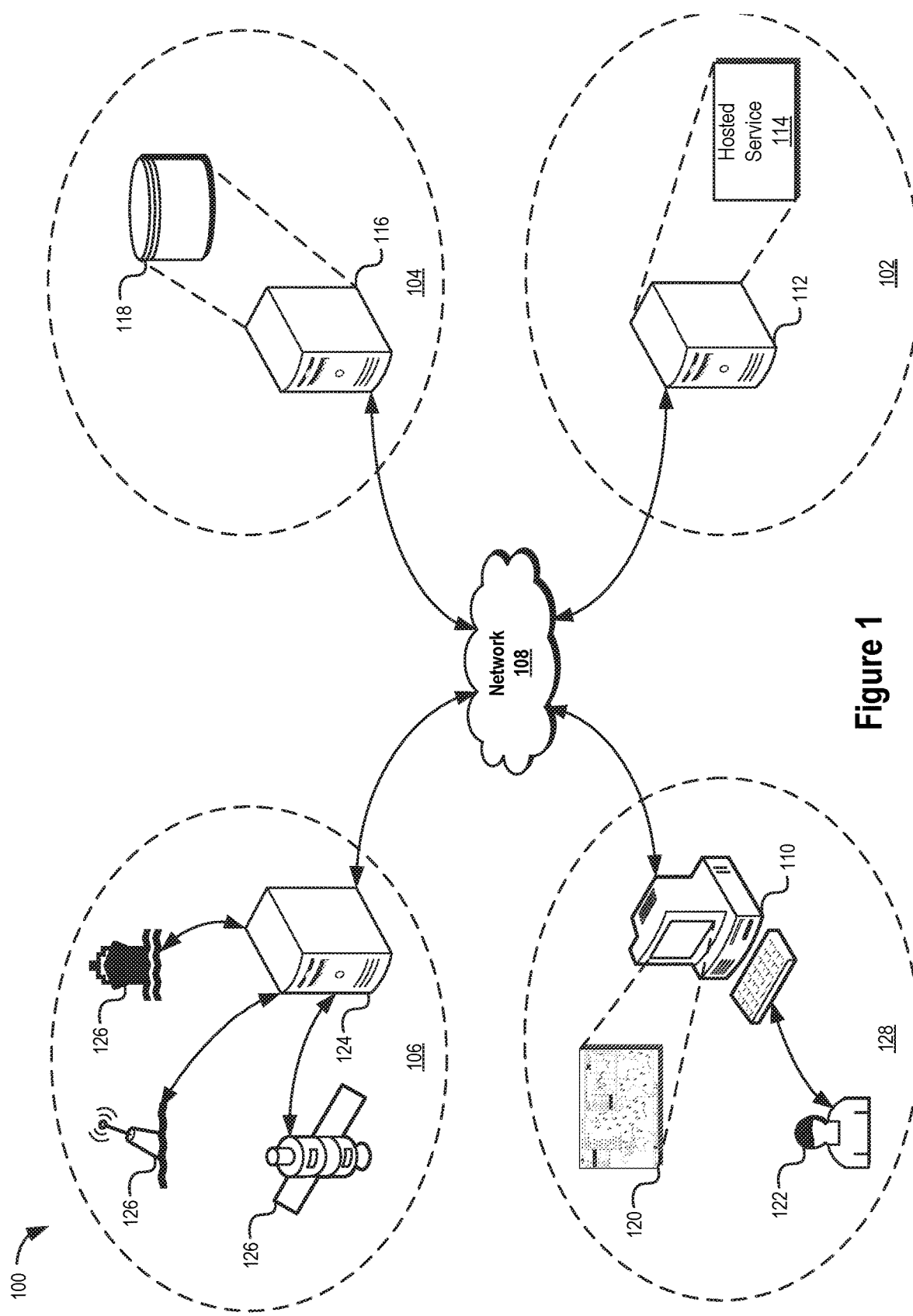
FIG. 1 illustrates an exemplary ecosystem for collecting, managing, and interacting with information provided by one or more data sources consistent with embodiments of the present disclosure.

Systems and methods disclosed herein may provide for collection, integration, processing analysis, and distribution of spatio-temporal data including Earth and planetary sciences data that may, at least in part, enable a user or system to explore and interact with data collected by a variety of data sources at a variety of locations. FIG. 1 illustrates an exemplary ecosystem 100 for collecting, integrating, managing, processing, analyzing, distributing, accessing, and interacting with information provided by one or more data sources 126 consistent with embodiments disclosed herein. Various systems and/or devices illustrated in FIG. 1 may be associated with one or more conceptual layers including, without limitation, a service layer 102, a data storage layer 104, a data collection layer 106, and/or a user system layer 128.

The ecosystem 100 and/or its constituent layers 102-106, 128 may comprise one or more computing devices and/or systems that may include, without limitation, a data collection system 124, a data storage system 116, a service system 112, and and/or a user system 110 communicatively coupled via a network 108. The connected systems 110, 112, 116, 124 may comprise a variety of computing devices and systems, including laptop computer systems, desktop computer systems, server computer systems, distributed computer systems, smartphones (e.g., the Apple® iPhone™, the Motorola® Droid®, and the BlackBerry® Storm™), tablet computers (e.g., the Apple® iPad™, the HP® Slate, and the Samsung® Galaxy™ Tablet), microcontroller-based embedded systems, and/or the like. As discussed in more detail below, the data collection system 124, data storage system 116, service system 112, and/or user system 110 may comprise at least one processor system configured to execute instructions stored on an associated non-transitory computer-readable storage medium. The data collection system 124, data storage system 116, service system 112, and/or user system 110 may further comprise software and/or hardware configured to enable electronic communication of information between the devices and/or systems 110, 112, 116, 124 via the network 108 and/or other communication channels using any suitable communication technology and/or standard.

Communication between the connected systems 110, 112, 116, 124 may utilize a variety of communication standards, protocols, channels, links and mediums capable of transmitting information between the systems 110, 112, 116, 124. For example, a satellite communication link may be used to exchange information between land-based data center systems and fixed or mobile devices in an environment. For such communication links, digital signal processing methods, software defined network methods, data sampling methods and other computer networking methods may be utilized to optimize bandwidth and latency of exchanged communication messages. In some embodiments, data may be exchanged when specific criteria are met relating to historic and/or forecasted data patterns. For example, a device (e.g., a glider, an unmanned vehicle, etc.) may only report temperature data if it is above known normal conditions for a specific spatio-temporal location (e.g., the Gulf of Mexico during January). Alternatively or in addition, data samples may be communicated after a specific or arbitrary number of samples have been measured and/or an aggregate value like an average has been computed based on a number of prior measurements.

Data Sources

One or more data sources 126 may be included in a data collection layer 106. The data sources 126 may provide one or more data streams to one or more communicatively coupled data collection systems 124. In certain embodiments, a data collection system 124 may be associated with a single data source 126, and may in some instances be integrated as a single system. In further embodiments, a data collection system 124 may receive and/or aggregate data streams provided by a plurality of data sources 126 at a variety of locations. Data sources 126 may be communicatively coupled with data collection systems 124 using any suitable communication and/or network methodology, including any of the communication and/or networking methodologies disclosed herein.

Consistent with embodiments disclosed herein, data sources 126 and associated data streams may be diverse. That is, data sources 126 may comprise, for example, a number of different types of data measurement, collection, and/or aggregation systems, may be associated with a variety of organizations and/or projects, may provide a number of different types of measurement information relating to a dynamic environment in a variety of different formats, and/or may provide spatially and/or temporally distributed data stream information. Some examples of such data sources and associated data streams include, without limitation, measurements from individual sensors, unmanned vehicles, satellites, robotic systems, one or more networked servers computing simulations and/or processing data, data centers, content resources available via the Internet and/or any other data source producing or containing spatio-temporal data. Embodiments of the systems and methods disclosed herein may allow a user and/or a system to collect, integrate, process, distribute, interact with, visualize, and/or otherwise analyze data stream information provided by such diverse data sources in an integrated manner utilizing a visual explorer system and/or programmable system interfaces and/or one or more other services.

The data sources 126 may comprise any suitable system for generating data relating to a dynamic environment. In some embodiments, data sources 126 may comprise systems providing information generated using one or more numerical models (e.g., computer models and/or algorithms generating data about a dynamic environment). In some embodiments, the data sources 126 may include one or more sensors and/or other measurement systems configured to produce such data. For example, in connection with producing data relating to the Earth's oceans, data sources 126 may include, without limitation, aerial satellites, planes, weather balloons, mobile water platforms, autonomous vehicles (e.g., over and/or underwater vehicles, etc.), gliders, wave gliders, drifters, floats, buoys (e.g., surface, shallow water, or bottom measurement buoys, etc.), robot swarms, boats or other vessels, living creatures with associated sensors, moored stations, remotely operative vehicles, acoustic and/or sonar measurement devices (e.g., hydrophone arrays, sonobuoys, etc.), oil platforms, offshore wind farms, artificial habitats (e.g., over and/or underwater habitats), and/or any other suitable data collection and/or generation system implementing any suitable sensor and/or collection of sensors. Alternative examples of data sources 126 not related to the Earth's oceans may include unmanned vehicles for land, air, and/or space.

Data streams generated by data sources 126 may comprise a sequence of measurements (e.g., temporally and/or geographically-spaced measurements) provided by the data sources 126. Exemplary data streams include, without limitation, atmospheric information (e.g., air pressure, air temperature, humidity, wind speed, etc.), biological information (e.g., microorganism abundance, biological-related acoustic information, soil measurements, forest floor thickness, soil texture, etc.), optical and radiation information (e.g., absorption, attenuation, reflectance, backscatter, transmissibity, etc.), chemical information (e.g., O2 levels, CO2 levels, chemical compositions, etc.), physical information (e.g., water conductivity, electrical conductivity, salinity, density, currents, wave height, temperature, pressure, flow, sea ice, etc.), human and industrial activity related information (e.g., technical details on oil and gas rigs and pipelines, network cables, solar plants, wind farms, mobile vessels and vehicles, land use, irrigation, use of pesticides, use of herbicides, fertilizers, etc.) and/or any other type of information relating to a dynamic environment including spatial and/or spatio-temporal information.

In certain embodiments, alternatively and/or in addition to measurement information, data streams generated by data sources 126 may comprise information relating to the data sources. For example, data streams may comprise metadata relating to a data source system. Such metadata may include, without limitation, system identification information, device status information (e.g., battery charge states or other device information associated with measurements taken at a particular point of time), types of data generated by data sources 126 (e.g., point data, gridded data, acoustic data, seismic data, sweep data, swath data, video data, text, images, mosaics), types of measurements generated by data sources 126 (e.g., illustrating the variety in the types of specific measurements, a sonar measurement could be performed using a combination of active or passive sonars, more specifically echo-sounders, multi-beam or side scan sonars, etc.), organizations associated with the data sources 126 (e.g., organizations responsible for developing, owning, trading, leasing, deploying and/or maintaining data sources 126), projects associated with the data sources 126 (e.g., research projects and/or initiatives), etc. Any other information that may be indirectly related to a dynamic environment (e.g., derived information) and/or information related to data sources 126 may also be included as part of data stream information.

In some embodiments, data streams received by data collection system 124 from data sources 126 may be in a variety of different formats (e.g., exchange formats including NetCDF, XML, KML, shapefile, etc.) and/or models (e.g., models used by WITSML standards or OGC Standards including an SWE Common Data Model). In further example, a data stream received by a data collection system 124 from a buoy-based sensor system may be formatted differently than a data stream received from a satellite system. Data collection systems 124 and/or data sources 126 may be associated with and/or operated by a variety of different organizations, each implementing a variety of different data exchange formats and/or methods in which the data is made accessible to other systems. In some embodiments, data collection systems 124 may store and/or exchange data streams provided by data sources 126 in the same and/or similar format that they are received. In yet further embodiments, data collection system 124 may transform data received by data sources 126 into one or more other formats, including standardized exchange formats for communication with other systems.

Data Storage

A data storage system 116 included in a data storage layer 104 may be communicatively coupled with the one or more data collection systems 124 via a network 108. The network 108 may comprise a variety of network communication devices and/or channels and may utilize any suitable communications protocols and/or standards facilitating communication between the systems disclosed herein. The network 108 may comprise the Internet, a local area network, a virtual private network, a seabed cable communication network, a mobile network, and/or any other communication network utilizing one or more electronic communication technologies and/or standards (e.g., Ethernet or the like). In some embodiments, the network 108 may comprise a wireless carrier system, such as a personal communications system ("PCS"), and/or any other suitable communication system incorporating any suitable communication standards and/or protocols. In further embodiments, the network 108 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 108 may incorporate one or more satellite communication links. In yet further embodiments, the network 108 may utilize IEEE's 802.11 standards, Bluetooth®, ultra-wide band ("UWB"), Zigbee®, and or any other suitable standard or standards.

The data storage system 116 may receive one or more data streams from the data collection systems 124. In certain embodiments, data storage system 116 may request a list of available data streams from one or more data collection systems 124 and, upon selecting an available data stream from the list, may receive the selected data stream from the one or more data collection systems 124. In further embodiments, data collection systems 124 may provide the data storage system 116 with notifications regarding newly available data streams. In yet further embodiments, data streams provided to the data storage system 116 may be data streams generated using one or more computational models.

In some embodiments, data storage system 116 may subscribe to one or more data streams published by data collection system 124. Data storage system 116 may receive all data streams made available by data collection system 124 or a subset thereof. For example, the data storage system 116 may request to receive all future information associated with a particular data stream, may request to receive prior data stream information (e.g., historical data streams), and/or may request to receive data stream information associated with a particular period of time.

In certain embodiments, data storage system 116 may perform various functions relating to the scheduling of data stream information transfers between a data collection system 124 and the data storage system 116. For example, in certain embodiments, data stream information may be transferred to data storage system 116 according to a "pull" model, in which the data storage system 116 may refresh and/or initiate a transfer of data stream information from data collection system 124 based on, for example, a refresh interval and/or schedule. Alternatively or in addition, data stream information may be transferred to the data storage system 116 according to a "push" model, in which the data collection system 124 may initiate a transfer of data stream information to data storage system (e.g., based on new data stream information becoming available from data sources 126 or the like). In some embodiments, data stream information transfers and/or processing may be scheduled according to priority information associated with particular data streams and/or processing workloads of the data collection system 124 and/or data storage system 116.

Data stream information received by data storage system 116 may be stored for access by data storage system 116 and/or other associated systems (e.g., a service system 112 and/or a user system 110 as discussed in more detail below). In certain embodiments, data storage system 116 may store received data stream information in one or more databases 118 and/or any other suitable storage structure and/or system (e.g., in distributed file systems supporting various storage mediums including physical hard drives, solid state storage, remote cloud-based storage such as Amazon Web Service ("AWS") S3™, EBS™, Glacier™, specialized storage virtualization systems such as FileTek™ and/or StorHouse™, or the like). In some embodiments, certain subsets of data stream information stored by data storage system 116 (e.g., information utilized by service system 112 on a regular basis) may be stored in one or more specified locations that may provide relatively high-speed access. In this manner, data stream information utilized on a regular basis stored by data storage system 116 may be accessed with increased responsiveness.

In some embodiments, the data storage system 116 may process and/or perform one or more transformations of data stream information received from the data collection system 124. For example, data storage system 116 may transform certain data stream information according to a common data model utilized by the visual explorer systems, programmable system interfaces, and/or other systems and methods disclosed herein. In further embodiments, the data storage system 116 may process and/or perform one or more operations that may impact other systems where data stream information is stored and/or is in use (e.g., a service system 112 and/or a user system 110). For example, one or more data streams may be repeated, repaired, and/or reverted to reflect information obtained from a data collection system 124 at a particular point in time. In certain embodiments, repeated, repaired, and/or reverted data stream information may be processed, transformed, and/or otherwise utilized to generate one or more data products associated with a previous time period. In further embodiments, such functionality may enable the data storage system 116 and/or other related systems to recover from a variety of errors, faults, and/or data collection, distribution and/or processing mistakes.

In yet further embodiments, certain data stream information may be restricted. For example, some data stream information may comprise private data stream information and/or data stream information associated with a particular user and/or organization. Similarly, access to certain data stream information may be subscription-based. In such embodiments, a user associated with a user system 110 that desires to utilize such data stream information may need to authenticate their right to access such information (e.g., authenticate their identity for utilizing a data storage system 116, data collection system 124, and/or service system 112) via any suitable authentication process (e.g., LDAP, OAuth, SSO, etc.).

Common Data Model

In certain embodiments, a common data model for spatial and/or spatio-temporal data may be used in connection with the systems disclosed herein. For example, in some embodiments, a data collection system 124 and/or data storage system 116 may transform different types of data stream information according to a common data model. Transformed data stream information may then be stored by the data storage system 116 (e.g., in database 118 and/or another suitable storage location). In further embodiments, data transformations implementing a common data model in connection with the systems and methods disclosed herein may be performed by a service system 112, a user system 110, and/or any other suitable system and/or systems. Transforming data stream information according to a common data model may allow for calculations, visualizations, and comparisons to be performed utilizing a variety of data in a variety of native formats (e.g., computations involving multiple data streams from multiple data sources may involve processing of a variety of data formats).

The common data model may utilize a standardized time and/or coordinate system that, in certain embodiments, may be a three-dimensional coordinate system and/or other suitable coordinate system (e.g., ED50, DTRS89, GRS80, NAVD88, SAD69, SRID, UTM, WGS84, etc.). In some embodiments, data stream information may be split into one or more data cells based on associated spatial coordinates and timestamps to allow processing of space-time regions. For example, spatial coordinates may define a 2-dimensional projection of a surface (e.g., the Earth and/or an ocean's surface) or a 3-dimensional projection of a volume (e.g., a volume of water in the ocean). The generated data cells may be utilized by the systems and methods disclosed herein to visualize and/or perform calculations relating to a particular space-time region. In certain embodiments, data transformations according to the common data model may be performed using a sub-set of data stream information requested by a system for visualization and/or calculation purposes.

In some embodiments, spatial coordinate-based data cells may utilize a grid and/or array structure. Data points included in a data stream may be associated with a particular cell in the grid and/or array. In certain embodiments, one or more grid and/or array structures may be utilized in parallel to enable organization of the data cells in varying resolutions. For example, a rectangular data grid may be used for visualizing a particular parameter as a 2-dimensional heat map representing global ocean values at a particular depth. Similarly, an unstructured data grid could be used for visualizing a heat map on a coastline or seabed. In yet further embodiments, a suitable grid structure may be used for visualizing a 3-dimensional volume (e.g., a volume of the ocean or the like). In some instances, a grid structure may represent aggregated measurements and/or modeling values of a particular parameter during a specific time period.

Grid structures may have varying resolution depending on the granularity of associated spatial coordinates. Different resolutions may allow for visualizations and/or calculations having varying levels of detail. For example, in a high resolution grid, a data cell could contain data points associated with a 1 m×1 m×1 m volume of space, while in a lower resolution grid, a data cell could contain data points associated with a 1 km×1 km×1 km volume of space. In certain embodiments, resolution of cells and/or grid structures may be associated with certain longitude and/or latitude values and/or time dimensions.

Instead of and/or in addition to assigning values from data streams into a cell based on spatial and/or spatio-temporal coordinates, one or more lower resolution grid structures may be computed based on sampling and/or aggregating values from higher resolution grid structures. A variety of projections may be used to map spatial coordinates into a coordinate system used to visualize values in data cells. In certain embodiments, visualizations and/or calculations relating to a particular space-time region may be performed by data storage system 116 and provided to service system 112 and/or user system 110, although other suitable implementations are also contemplated.

Spatio-Temporal Data Services

A service system 112 associated with a service layer 102 may be communicatively coupled with the one or more data collection systems 124 and/or data storage systems 116 via network 108. In certain embodiments, the service system 112 may be configured to offer one or more remote and/or hosted services 114 to one or more connected systems. For example, in certain embodiments, the service system 112 may offer a visual explorer service or a programmable system interface as a hosted service 114. In certain embodiments, the visual explorer service may include certain features of the service and/or interface described in commonly assigned co-pending U.S. patent application Ser. No. 13/927,987, filed Jun. 26, 2013, and entitled "Systems and Methods for Interacting with Spatio-Temporal Information", the content of which is incorporated herein by reference in its entirety. Systems connected to network 108 (e.g., user system 110) may be capable of communicating with the service system 112 and interacting with the hosted service 114.

In certain embodiments, the service system 112 may, among other actions, perform one or more computations on data stream information stored and/or managed by data storage system 116. For example, the service system 112 may receive a service request issued by the user system 110 to provide the user system 110 with information pertaining to one or more visualizations. In further embodiments, the service system 112 may receive a service request to provide a user system 110 with one or more numerical responses including, for example, statistical information relating to particular spatial and/or temporal coordinates (e.g., average temperatures, storm occurrences, etc.), textual responses, and/or any other desired responses and/or information that may be included in and/or derived from data stream information accessible by the service system 112 (e.g., accessible from data storage system 116 or the like).

The service system 112 may request corresponding data stream information from the data storage system 116, perform the processing and/or computations on the data stream information requested by the user system 110, and provide the results to the user system 110 (e.g., results in the form of a visualization and/or other related information). In some embodiments, the service system 112 may perform certain transformations of data received from the data storage system 116, calculate aggregate and/or statistical values based on the data, generate one or more visualizations and/or animations based on the data, generate information derived from the data based on one or more computational models, provide one or more textual responses, and/or the like.

In some embodiments, results of transformations, visualizations, and/or calculations performed by the service system 112 may be referred to as a data product. In certain embodiments, data products may be stored by the service system 112 and/or the data storage system 116 for future use and/or may be sent to a user computer system 110 in response to a service request. In some embodiments, certain data products may be stored in one or more specified locations that may provide relatively high-speed access. In this manner, stored data products utilized on a regular basis may be accessed with increased responsiveness.

Responses to service requests issued by user system 110 may be sent to the user system 110 and displayed to a user 122 via a visual explorer interface 120. For example, in response to a service request, the service system 112 may send the user system 110 one or more visualizations, maps, animations, charts, calculations, raw data information, and/or any other requested type of information or data product that may be viewed by a user 122 via the visual explorer interface 120.

In certain embodiments, a service request may create a session with the service system 112 that may allow the user system 110 to receive updates without issuing further service requests to the service system 112. For example, if new data stream information becomes available in data storage system 116 that matches a service request creating a session, the service system 112 may provide data products utilizing the new data stream information to the user system 110 without the user system 110 issuing a new service request. In some embodiments, creation of a session may allow a user system 110 to subscribe to updates from the service system 112 relating to prior service requests.

Optimized Service Responses

In certain embodiments, data sent to user system 110 may be reduced in time and/or location resolution based on a volume of data the user system 110 is capable of receiving and/or the visual explorer interface 120 is capable of displaying. For example, at a given time, the visual explorer interface 120 may only be capable of displaying information pertaining to a certain geographic region. Accordingly, data sent to the user system 110 at a particular time may be limited to only data pertaining to the displayed geographic region. In further embodiments, subsequent data measurements and/or data measurements that are close in vicinity may be averaged, original measurements may be dropped, and an averaged result may be sent to a user system 110 in response to a service request.

User System

A user system 110 associated with a user system layer 128 may be communicatively coupled with the one or more data collection systems 124, data storage systems 116, and/or service system 112 via network 108. In certain embodiments, the user system 110 may be configured to interact with one or more services offered by service system 112 (e.g., a hosted service 114 such as a visual explorer service) and/or access data generated and/or stored by data collection system 124 and/or data storage system 116.

As discussed above, among other functions, the user system 110 may issue one or more service requests to a service system 112 in response to requests from a user 122 interacting with the user system 110 via a visual explorer interface 120. In certain embodiments, the visual explorer interface 120 may comprise any suitable interface configured to allow a user to interact with a visual explorer service. For example, using the visual explorer interface 120 a user may, among other things, view one or more visualizations and/or animations relating to data stream information and/or other data products, issue service requests to service system 112 via one or more controls, interact with data stream information and/or other data products, request information regarding available data sources 126, and/or the like.

In certain embodiments, the visual explorer interface 120 may be associated with a native application executing on the user system 110 configured to interact with the systems as disclosed herein. In further embodiments, the visual explorer interface 120 may be an interface of a web-based application configured to interact with a remotely hosted application and/or service (e.g., hosted service 114) using, for example, a web-browser and/or any other suitable application.

It will be appreciated that a number of variations can be made to the architecture and relationships presented in connection with FIG. 1 within the scope of the inventive body of work. For example, certain system functionalities described above (e.g., functionalities of data sources 126, data collection system 124, data storage system 116, service system 112, and/or user system 110) may be integrated into a single system and/or any suitable combination of systems in any suitable configuration. Thus, it will be appreciated that the architecture of FIG. 1 is provided for purposes of illustration and explanation, and not limitation.

Use of Spatio-Temporal Data

Figure 2:
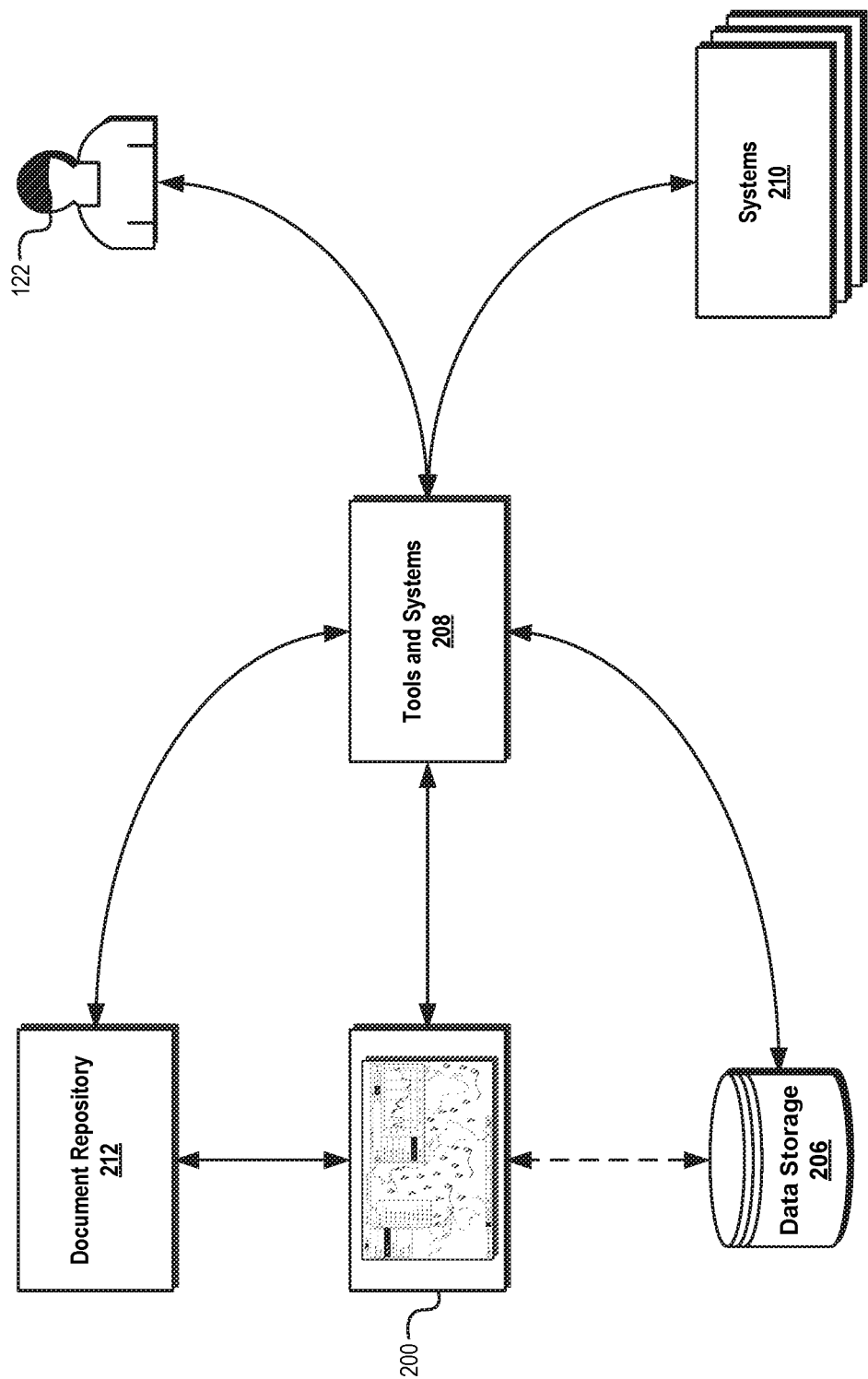
FIG. 2 illustrates exemplary use of spatio-temporal data consistent with embodiments of the present disclosure.

FIG. 2 illustrates exemplary use of spatio-temporal data consistent with embodiments disclosed herein. In certain embodiments, a user 122 may interact with, analyze, and/or otherwise process and/or distribute spatio-temporal data stored by one or more data stores 206 using a variety of offered tools and/or systems 208. For example, a user 122 may interact with and/or analyze spatio-temporal data using a visual explorer 200, as discussed above. In certain embodiments, a user 122 and/or a group of users may utilize a number of interfaces to collaborate and/or coordinate analysis of available spatio-temporal datasets. In some embodiments, systems 210 (e.g., automated control systems) may further interact with offered tools and systems 208 in connection with analyzing and/or utilizing available spatio-temporal datasets.

In interacting with spatio-temporal datasets, users 122 and/or systems 210 may utilize a variety of functions to add, remove, update, integrate, slice, dice, filter, transform, process, visualize, query, and/or otherwise analyze available spatio-temporal data. In some embodiments, such functions may be available to a user 122 via a symbolic representation (e.g., a text, binary, image, etc.) included in a visual explorer 200. Functions may be performed by a tool and/or system 208 used by the user 122. In further embodiments, functions may be relayed to other systems (e.g., via a visual explorer) using a suitable data protocol and results may be aggregated and/or sent to the users 122 as they are received by the relaying tool and/or system 208.

Document Repository

In certain embodiments, results of work performed using available functions may be in the form of data, code, algorithms, models, statistics, visualizations, and/or the like and may be stored as one or more documents in a document repository 212. Documents may be shared and/or discussed between users 122 using collaborative functionalities associated the visual explorer 200. For example, work performed using available functions and/or documents derived therefrom may be exchanged synchronously or asynchronously between users 122 and/or systems 210 during performance of the work and/or after results are created.

Data Protocol

In certain embodiments, spatio-temporal data may not be downloaded to a tool and/or system 208. Rather, computations utilizing the spatio-temporal data may be performed by the visual explorer 200 and/or data storage 206 based on one or more messages exchanged using a data protocol. In further embodiments, resulting data may be sent to a tool and/or system 208 as a response to a message sent to the visual explorer 200 and/or data storage 206. In some embodiments, the messages may be encoded as a Uniform Resource Locator ("URL") to identify a subset of spatio-temporal data and/or multiple subsets of spatio-temporal data requested by a tool and/or system 208. An exemplary URL may be in the form: <protocol>://<domain>/<service identification>/<command parameters>.

In some embodiments, an example URL encoding a function for spatio-temporal filtering of data may include in the command parameters a zoom level to indicate a spatial resolution of individual data points, a spatial location definition (e.g., a geo-tag along with depth or height from Earth's surface), a list of arrays defining the dimensions of the filter along with specific values or ranges of value, a time window defining the temporal dimension of the data, and/or the like. A response to the URL may include metadata regarding a resulting dataset and/or the spatio-temporal dataset fulfilling filtering criteria in a format supported by the tool and/or system 208. In some instances, a portion of and/or the entire response may be compressed to reduce the size of the response. In further embodiments, a resulting dataset matching the URL may be sent in multiple smaller datasets to allow partial processing.

For certain messages, resulting datasets may be prepared and stored in a format that enables relatively fast lookup of a particular slice of the dataset. For example, datasets may be sliced according to a particular dimension (e.g., time) and an index may be used to identify relevant data in one read. Exemplary formats that may be used to store datasets include, without limitation, netCDF-4, HDF5 and GeoTIFF. Exemplary indexes that may be utilized may include Fastbit, compressed bitmap indexes, and/or the like.

In certain embodiments, responses may include metadata relating to an associated dataset. For example, responses may include information describing the structure of a resulting dataset, types and/or units of associated parameters, locations, data availability and/or coverage, data sources, and/or any other descriptive information about the dataset that may be utilized in connection with a tool and/or system 208 making the request via a data protocol. In further embodiments, a visual explorer 200 may offer a canonical representation of spatio-temporal data in a self-describing and/or well-defined convention such as, for example, CF-NetCDF. This may ease integration of different tools and/or systems 208.

Combining Datasets for Analysis

In some embodiments, certain data protocol messages may represent functions that could be used to add, edit and/or integrate data, such that a user 122 may integrate multiple datasets stored on data storage 206 using the messages. As an example, the integration may be performed by listing multiple URLs to individual datasets in an associated tool and/or system 208 to identify spatio-temporal datasets that may be used for data analysis. In some embodiments, the integration of different datasets may be performed by the tool and/or system 208. In further embodiments, the integration of datasets may be performed using the visual explorer 200 and/or a programmable system interface function.

Examples of analysis results and functions utilizing the systems and/methods disclosed herein (i.e., systems and methods for analyzing single and/or multiple datasets) include, without limitation, creating new datasets based on processing and/or combining existing datasets, filtering subsets of data by data and/or related metadata, re-gridding data into alternative grid structures, aggregating data into statistics and/or metrics, interpolating new values via triangulation and/or Kriging, reprojecting from a coordinate system to another, computing spectrograms of acoustic data and/or quality flags representing extreme values and/or trends in the data and/or related metadata, and/or the like.

In some embodiments, use of methods designed for analysis of data may produce information that may be used for tracking dependencies between data and data products, re-computing datasets to account for specific dependencies between data, sharing data via security rights to a specific subset in a dependency graph. Some examples protocols that may be used for analyzing combined datasets include, without limitation, DAP, WFS, WMTS, and/or WCS.

Authorization and Authentication

In some embodiments, the external storage 206 and/or visual explorer 200 could contain confidential and/or sensitive data. To ensure that only authorized users 122 and/or systems 210 are allowed to access and/or otherwise utilize the sensitive data, messages exchanged in the data protocol may include an identification token. In further embodiments, an identification token may be used in connection with non-sensitive data to track user actions with such data. Identification tokens may be processed by tools and/or systems 208, visual explorer 200, and/or storage 206 to determine whether a requested use of data is permitted.

Registering New Datasets and Work Results

The visual explorer 200 and/or a programmable system interface may provide a manner for registering new datasets and/or associated metadata for integration (e.g., automatic integration) of spatio-temporal datasets. A registered dataset may be stored, for example, by the visual explorer 200 and/or external storage 206. In some embodiments, registered datasets may be processed based on the dataset content and/or associated metadata and matching processing results may be sent to systems that have subscribed to specific events by defining specific rules (e.g., receive all data about the Arctic region) or other suitable subscription methods.

In some embodiments, a registered dataset may be identified as an URL along with metadata describing the dataset with the data remaining on a separate storage. Integrating metadata in a visual explorer 200 without collecting data may be used in connection with sensitive or large datasets that remain stored in a different physical location. In certain embodiments, the integration may be performed by mapping the external data to the canonical data model based on the external dataset metadata.

Integration with Tools

Integration of analytical tools with the visual explorer 200 may utilize standardized protocols for data exchange. Exemplary protocols that may be supported by the visual explorer 200 include, without limitation, OPeNDAP, Open Data, Open Search and/or any protocol that enables work with spatio-temporal datasets. Commands exchanged between the visual explorer 200 and the tools and/or systems 208 may be stored by the visual explorer 200, allowing the visual explorer to integrate, recreate, and/or exchange work results created across multiple tools, systems, and or computing devices.

Integrated Collaborative Analytics

Results of the work with spatio-temporal data may be in the form of data, code, algorithms, models, statistics and/or visualizations that may be combined into documents (e.g., stored by document repository 212) and/or used in discussions between users 122. A variety of document repositories may be utilized as document repository 212 and/or integrated into aspects of the visual explorer to enable exchange of work results between users 122 and/or systems 210 including, without limitation revision control and source code management systems, forums, blogging, microblogging and/or social networking services, e-mail services, instant messaging systems and/or threaded conversation systems, a wiki, document and/or knowledge management systems, image and/or video management and sharing systems, enterprise messaging systems and/or message brokers, data analytics platforms, and/or the like.

In some embodiments, a visual explorer 200 may allow certain contents of the document repositories 212 to be reused for producing new work results. In some embodiments the contents of the document repository may be stored in the data storage 116 and be handled in the same or similar way as other data streams in the systems. In further embodiments, visual explorer 200 may relate a particular work result to one or multiple data dimensions. A relation between a work result and a dimension may allow a user 122 to reuse data along with related work results. In some embodiments, a URL may be used to encode relevant information to locate, recreate, and/or retrieve a work result. A URL may be similarly used for exchanging results. In some embodiments, the exchange of results may be achieved by exchange of messages between the interfaces of different tools and/or systems 108. For asynchronous exchange of messages, a queuing system could be used, allowing users 122 and systems 210 to subscribe and unsubscribe to events initiated by work results. For synchronous integration of interfaces, protocols like full-duplex communications channels could be used (e.g., a WebSocket based solution may be used for web based solutions).

Embodiments of the platform disclosed herein may enable collaboration of users accessing the content and/or data via a variety of devices. A device may interface with the platform using an associated application programming interface ("API"). In certain embodiments, the API may be implemented using representational state transfer ("REST"). The platform may also enable integration of control systems via the API, with examples of such control systems including oil platforms, wind farms, ships or devices conducting measurements of environment, and/or the like.

In certain embodiments, systems and methods may collect, process, integrate, analyze and apply data available for the public and/or data only available to specific set of users and/or systems. The data may be of different types including, for example, point measurements in space-time obtained using individual sensors (e.g., profiling buoys, remotely operated vehicles ("ROVs"), ocean-borne platforms like mobile gliders, drifters and floats, unmanned vehicles), structured gridded data products computed by supercomputing centres, simulation and/or machine learning models (e.g., climate, atmosphere, and/or ocean models with information on temperatures), and/or any other suitable type of data. In further embodiments, the data may be in the form of radar sweeps, satellite swaths and/or acoustic measurements by hydrophones or sonars.

Overview of Spatio-Temporal Data Processing Architecture

Figure 3:
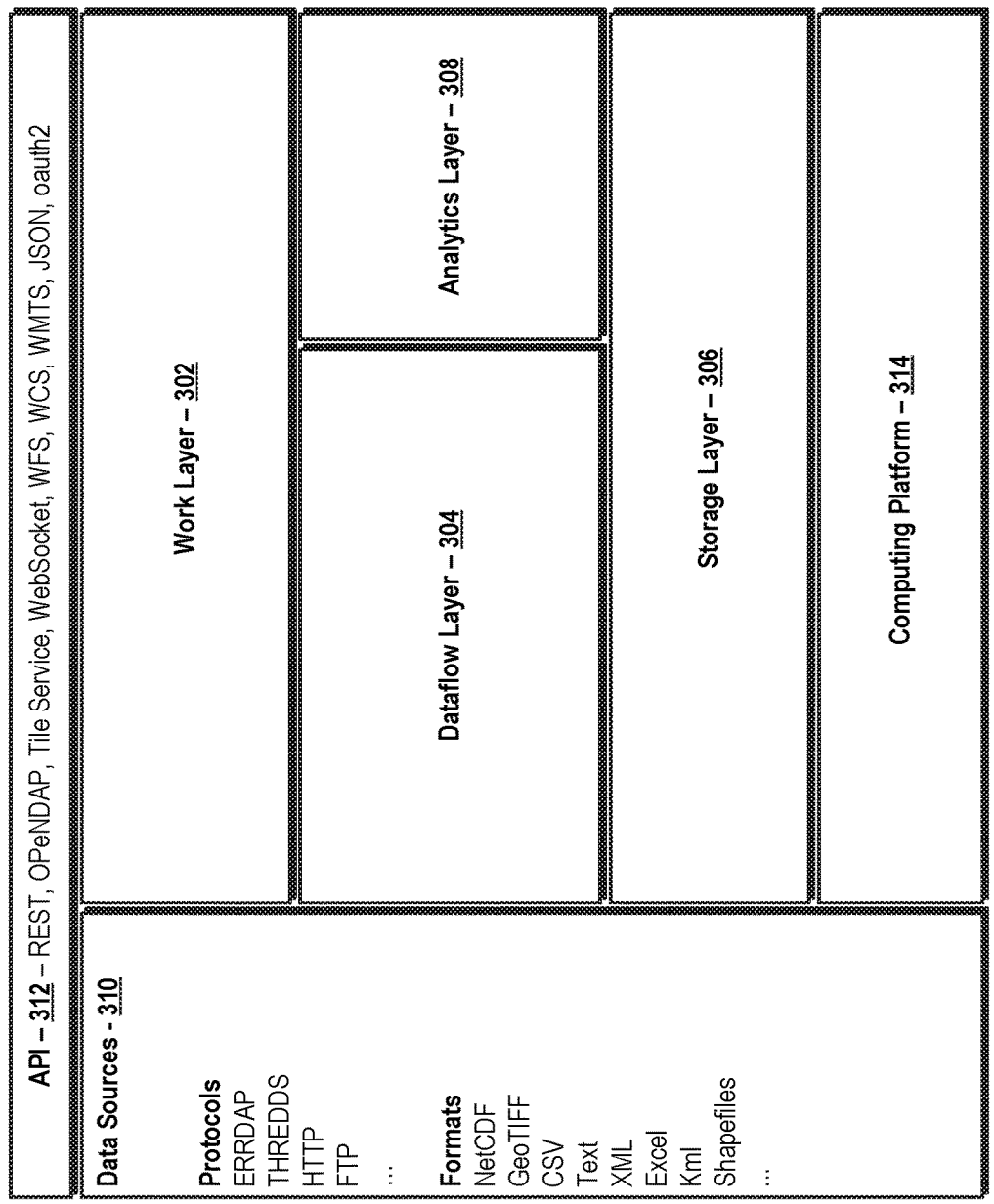
FIG. 3 illustrates an exemplary software architecture implementation of a spatio-temporal data platform consistent with embodiments of the present disclosure.

FIG. 3 illustrates an exemplary software architecture 300 implementation of a spatio-temporal data platform consistent with embodiments of the present disclosure. In certain embodiments, the spatio-temporal data platform may be implemented by offering, among other things, functions that support data collection and integration from diverse data formats/organizations/hardware, storing of data, downloading of data from the system, analyzing and visualizing data available within the system, computing spatial functions relating to the data, enabling access to the data and data processing via an API supporting a variety of data protocols, storage for raw data in a compressed format, columnar storage for point measurements (e.g., in-situ measurements), array storage for gridded and/or multi-dimensional measurements, a combination of one or more databases and/or file systems for storing gridded data and satellite measurements, in-memory storage for responsive analytics, queries, means for working with private data streams, capacity for scientific visualization of data, multi-dimensional exploration of data using interfaces implementing 2D or more dimensional maps (an example of 4D map could be a physical sphere or any other shape with interface for visualizing, animating and working with a spatial environment changing in time), integration possibilities for 3rd party free or commercial applications, and/or the like. In certain embodiments, the systems and methods disclosed herein may be implemented using, at least in part, cloud computing-related services and software. Alternatively the system may be implemented within a set of devices (e.g., buoys, cars, planes, robots, unmanned vehicles) and/or installed as a standalone system within a larger control system (e.g., in an oil rig, ship, rocket, satellite constellation, etc.) and/or implemented in one or more servers and/or datacenters.

Various systems and/or components of the illustrated architecture 300 may be associated with one or more conceptual layers, components, and/or platforms for performing certain functions of the systems and methods disclosed herein. The conceptual layers, components, and/or platforms may include, without limitation, a work layer 302, a dataflow layer 304, a storage layer 306, an analytics layer 308, data sources 310, APIs 312, and/or one or more computing platforms 314. In certain embodiments, certain conceptual layers, components, and/or platforms of the illustrated architecture 300 may perform functions similar to the systems and/or layers described above in connection with FIGS. 1-2.

The illustrated architecture 300 may be changed or extended with additional layers to serve a particular purpose and/or function. For example embodiments that may be embedded into devices may comprise a batch layer (e.g., Python, C++), a real-time layer (e.g., Scala), an agent layer (e.g., Java, C++), and/or an embedded layer (e.g., C++). Batch and real-time layers may be integrated and run within one or more data centers. A batch layer may provide advanced analytical capabilities optimized for high data volumes and throughput and be configured to operate in connection with large data batches. A real-time layer may queue incoming data vents and provide real-time analytical capabilities optimized for low latency. Data from the real-time layer may be periodically moved into the batch layer. In some embodiments, batch layers may have multiple deployments to allow remote data querying and replication. An agent and embedded layer may run in hardware constrained (e.g., bandwidth, CPU, RAM, storage, and/or power constructed) and security, upgrade, robustness constrained environments. An agent layer may collect, process, store, index and/or forward data generated by local sensors to the real-time layer in one or more datacenters. An agent layer may store data locally to meet the constraints and forward data at sufficiently low rate and/or reduce volume of data to remain within the constraints. An agent layer may further apply transformations, computations and/or quality control to the data collected. In addition, the agent layer may apply lossless, incremental, lossy compression and/or downsampling to collected data.

The agent layer may trigger based on predefined events, such as encountering extreme values. Further, the agent layer may send data in response to specific queries. The agent layer may integrate with device control components to enrich passively collected sensor data and improve device control. An embedded layer may operate specific sensor(s) and/or actuator(s), collect the data, and/or perform simple processing of collected data. An embedded layer may downsample collected data and/or use other efficiency and optimization methods to remain within constraints.

The dataflow layer 304 may provide a variety of dataflow and/or workflow services used in connection with collecting, integrating, and processing a variety of spatio-temporal data types provided by data sources 310 in an efficient manner. Exemplary types of spatio-temporal data that may be processed by the dataflow layer 304 may include, without limitation, gridded data (e.g., model outputs, array developments, normalized datasets), point data (e.g., in-situ devices with sensors measuring a surrounding environment such as buoys, gliders, stations, FerryBoxes, mobile platform measurements forming a trajectory and/or depth/height measurements, and/or computed values forming a profile), swath data (e.g., satellite data, light detection and ranging ("LIDAR") data), sweep data (e.g., radio detection and ranging ("RADAR") data), acoustic data (e.g., acoustic Doppler current profiler ("ADCP") data, sonar data, bio-acoustic data), and/or any other suitable type of data. Data collected from data sources 310 for processing by dataflow layer 304 may be in a variety of formats and/or communicated via a variety of protocols.

The storage layer 306 may provide storage and processing services for human and/or machine-generated data (e.g., spatio-temporal data) and metadata. Certain embodiments of the storage layer 306 may utilize database analytics methods including, for example, relational databases, columnar databases, array databases, triplestores, and/or methods and functions related to indexing, storing, and/or processing spatio-temporal data. The analytics layer 308 may provide analytic services in connection with data stored by storage layer 306. In some embodiments, the analytics layer 308 may utilize data in connection with various methods including, without limitation, machine learning, quality control, and/or quality assurance methods.

Embodiments of the systems and methods disclosed herein may allow storage and processing of data and associated metadata by storage layer 306 having diverse data types. Metadata may be used in connection with the systems and methods disclosed herein in a variety of ways including, for example, in connection with organizing data for access, processing, and/or analysis, scheduling activities within a system and/or integrated external systems, customization of models, visualizations, and datasets to match specified ranges, and/or any other method allowing for selection of a subset of data based on available metadata.

The work layer 302 may provide various services for interacting with, visualizing, and/or otherwise analyzing spatio-temporal data. For example, the work layer 302 may provide various visual exploration, processing, management, navigation, and collaboration-based services, and may leverage functionality of the dataflow layer 304, storage layer 306, and analytics layer 308. In some embodiments, the work layer 302 may provide visual explorer services and/or interfaces as discussed above. In certain embodiments, a user may interface with services facilitated by the work layer 302 (e.g., via a computer system browser or the like) via various suitable APIs 312 or other data protocols for cloud-based systems and services.

Certain machine-generated data may be represented as a multivariate time-series and/or output from n-dimensional sensors such as audio, images, video, infrared, seismology, and/or remote sensing. Analytical methods used in connection with the work layer 302 may utilize, without limitation, correlation matrices, Fourier spectrograms, spatio-temporal analytics, statistical modeling, simulations, and/or the like. Embodiments of the systems and methods disclosed herein may be utilized in integration, processing, and distribution of multivariate time series and/or n-dimensional datasets as well as other types of data.

A variety of industries may produce data utilized in connection with embodiments of the systems and methods disclosed herein. For example, data may be produced, without limitation, by agriculture, telecommunication, electric grid, transportation and logistics, healthcare, industrial automation, supervisory control and data acquisition ("SCADA"), sensor networks, computing and network infrastructure providers, e-commerce, social, mobile, location-based service, gaming, finance, payments, security and defense, and renewable energy industries.

Embodiments of the systems and methods may be utilized in connection with a variety of computing systems, protocols, technologies, services, and/or libraries. For example, the work layer 302, dataflow layer 304, storage layer 206, analytics layer 308, data sources 310, and/or APIs 212, may utilize a variety of computing technologies, methods, formats, and/or protocols to perform associated functionalities, including any of the technologies, methods, formats, and/or protocols illustrated in connection with FIG. 3 and/or combinations thereof. Moreover, certain embodiments may be implemented without using the specific technologies, methods, formats, and/or protocols illustrated in connection with FIG. 3. Thus, it will be appreciated that the architecture of FIG. 3 is provided for purposes of illustration and explanation, and not limitation.

Data Flow

Figure 4:
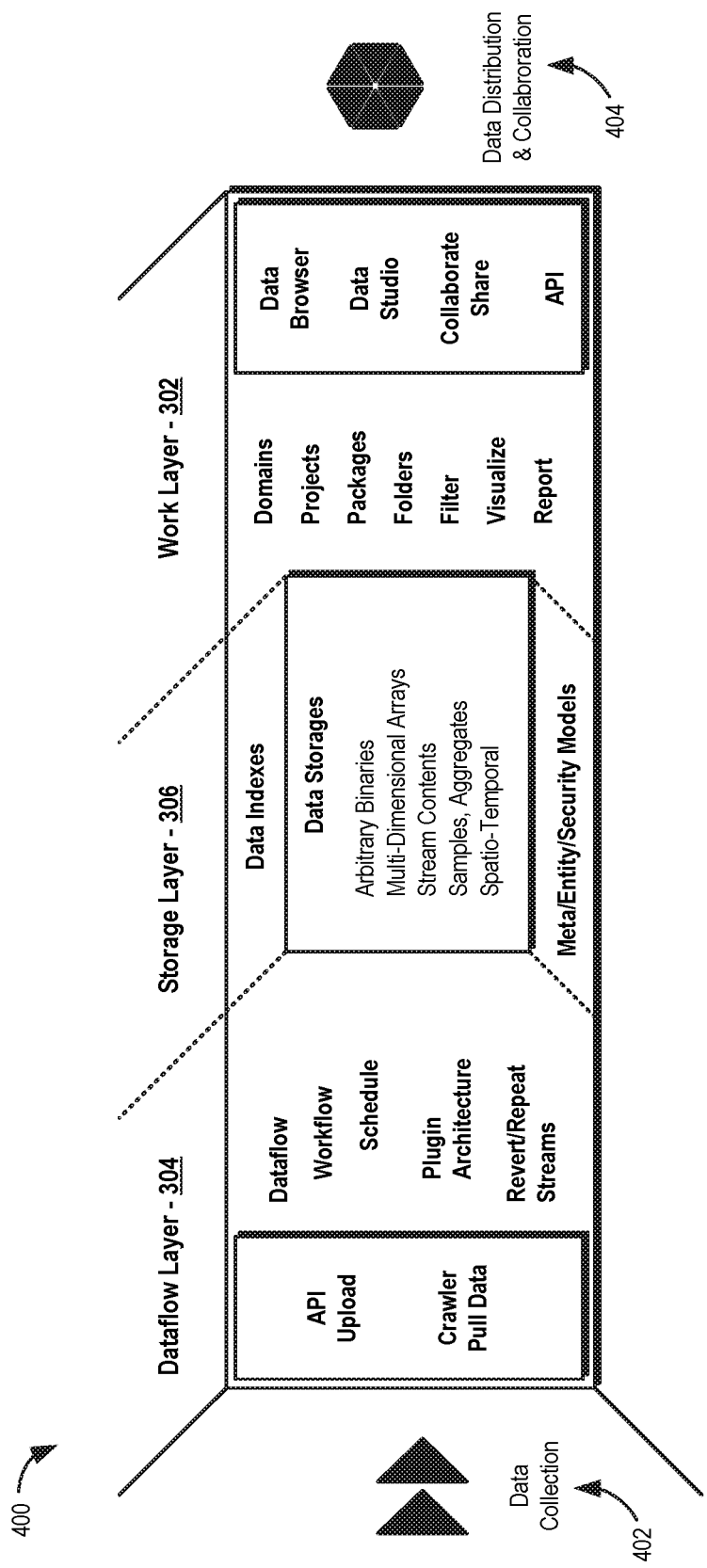
FIG. 4 illustrates a diagram showing an exemplary flow of data in connection with the disclosed systems and methods consistent with embodiments of the present disclosure.

FIG. 4 illustrates a diagram 400 showing an exemplary flow of data in connection with the disclosed systems and methods consistent with embodiments of the present disclosure. Particularly, the diagram 400 shows a flow of data in connection with the disclosed systems and methods from data collection 402 to eventual use and distribution of the data 404.

A data stream may include data items that are ordered according to one or more timestamps. In certain embodiments, a data stream may be computed and/or otherwise derived from other data streams. In further embodiments a data stream may comprise a real-time stream containing real-time events where events may be added to the tail of a queue and data from the head of the queue may be moved into a regular data streams. Data streams may be managed by one or more plugins. A plugin may be a software component adding specific capacity for the platform to handle a particular type of data stream. Each instantiation of a data stream may be configured as a channel.

Data streams may comprise a variety of types of data including, without limitation, the following data types:

Time series—This data type may include, for example, spatio-temporal point measurements of an environment (e.g., ocean or any other fluid environment, atmosphere or any other gaseous environment, Earth's crust or any other solid environment).

Multi-dimensional—This data type may be in a form of gridded measurements from, for example, RADARs, LIDARs, satellites, sonars, and/or as an output of a simulation process (e.g., computational fluid dynamics simulation, weather simulation) formed in array-oriented data format (e.g., NetCDF) or any other data format suitable for representing multi-dimensional data.

Analytical data—This data type may include values representing data quality, statistics, model or prediction output, output of model or data ensembles, and/or the like. Such data may be computed based on content of other streams or data available in a storage layer.

Visualization data—This data type may be computed based on other data and be a format (e.g. GeoTIFF, PNG) that can be used as input for visualization methods and functions or served via system interfaces to external systems like web browsers or web services (e.g., map tiles).

Metadata—This data type may include data associated with other data describing the origins, structure, design and any other relevant detail about the other data.

Raw Incoming Data—This data type may include data of an arbitrary data type and format that is processed using a collection plugin as described below in a way that allows embodiments of the systems and methods disclosed herein to integrate, process and distribute it. Examples of such data include raw input data from sensors, acoustic data and/or video data, documents, e-mails, source code of data collection, integration, processing analysis, and/or visualization methods and/or the like.

The dataflow layer 304 may perform data warehousing functions associated with data stream extraction, collection, and/or transformation of collected data streams 402. In certain embodiments, functionality of the dataflow layer 304 may be repeatable, revertible, and/or repairable, as described herein. Data collection 402 may include external data events that provide the basis for incoming data streams. In certain embodiments, data collection 402 may utilize data uploaded to the system via an API and/or by the system crawling a network address space for data and/or protocols matching certain criteria and downloading identified data into the system for further processing.

The dataflow layer 304 may include workflow functionality to define and/or manage a set of tasks to produce a particular output, some of which may include user and/or external system interaction. The dataflow layer 304 may further include dataflow functionality configured to combine multiple input streams into a single stream, and may be implemented as a dataflow plugin. Certain outputs generated by the dataflow layer 304 may be stored by methods included in a storage layer 306 and/or used in connection with methods offered by a work layer 302 performed by one or more users and/or one or more systems.

Certain functions performed by the dataflow layer 304 may be repeatable, where new data streams may be added that may depend on previously collected data streams, revertible, where data stream items with associated external data may be deleted and such changes may be propagated through the system to the dependent streams and sub-components, and repairable, where data streams can be repaired with cascades to other data streams depending on the repaired data.

Repairing of data streams may comprise reverting to a specific set of elements of a data stream by marking certain elements as invalid. For example, in the case of point data streams, a data stream may be restricted to certain given stream temporal suffixes (e.g., tail elements of a data stream, where the data stream may be defined generally as a sequence of elements ordered by time. The dataflow layer 304 may cascade such a reversion to dependent elements of reverted elements. Further, the dataflow layer 304 may recalculate substitution elements for reverted stream elements and their successors and similarly cascade such substitution elements to dependent elements. In circumstances where a reverted stream does not have a predecessor stream, a repair of the stream may not be performed and existing streams may be considered effectively reverted. Changes introduced by such stream elements and their dependent elements may be rolled back.

In certain embodiments, dataflow layer 304 may calculate data streams when source data becomes available. In some embodiments, such functionality may allow the dataflow layer 304 to correct errors in data processing algorithms and/or adapt to new data model additions (e.g., by introduction of new measurement types or data dimensions into the system). Moreover, the dataflow layer 304 may extend existing data workflows (e.g., by adding data quality streams which may be subsequently calculated for existing streams from which new quality streams may depend on) and may roll back data by reverting to root (e.g., original) data streams.

Events performed by the dataflow layer 304 may be scheduled by a scheduler. Such a schedule may be utilized by the collection, workflow, and/or dataflow functionalities of the dataflow layer 304 to assign particular times, dates, and/or periodicity to tasks and/or events performed by such components. In certain embodiments, data streams produced by the dataflow layer 304 may be based on external data events (e.g., data events driven by a data collection plugin or the like). In further embodiments, scheduled events may be performed by other parts of the system, for example by the storage layer 306, work layer 302, analytics layer 308, computing platform 314, data sources 310, and/or API 312 and/or any extensions thereof. An example of such extension layers may be batch, agent, real-time, and/or embedded layers as described above in connection with an exemplary architecture for embedded devices.

The storage layer 306 may perform storage-related functions related to integrating, processing, and distributing diverse spatio-temporal data. In certain embodiments, the storage layer 306 may utilize one or more data models in connection with performing storage-related functions. For example, a meta model describing entities associated with a data stream in a particular domain may be used that may include descriptions of different data classifiers (e.g., measurement type, data source type, etc.), metadata attributes, and/or meta relation types. A domain may comprise a system deployment considered to be unique by the platform with an associated identifier. In further embodiments, the storage layer 306 may utilize an entity model including descriptions of specific entities associated with data streams (e.g., institutions, projects, platforms, data sources, platform/data source deployment, data streams) and/or meta attribute and/or meta relation values of such entities. In yet further embodiments, the storage layer 306 may utilize a security model describing authentication and/or authorization setup in terms of principals, privileges and/or roles, data access restrictions with other domains, and/or which principals can collect what kind of data into the system.

The storage layer 306 may utilize one or more databases and/or data storage solutions to store data streams and/or other spatio-temporal data and/or information related to data streams. For example, the storage layer 306 may utilize a segment database to store binary segments of data stream content and/or to provide support for storing multi-dimensional arrays and/or any other type of data (e.g., text, video, audio, images, and/or documents). A segment database may be used to store and/or represent one or more stream log entries that may be used in connection with repairing, repeating, and/or reverting data streams. A stream database may be used to store and/or represent stream content by using, for example, a relational and/or columnar database. An index database may be used to index data stream content, and/or provide samples, aggregates, and/or efficient spatio-temporal queries based on the content. An analytics database, comprising multidimensional dataset storage (e.g., as implemented in SciDB), may be used for conducting data analysis based on the content available in the system. A metadata database may be used for storing metadata about data stream contents or any other data in the system. A security database may be used for storing data relevant to a structure defined by a security model. One or more of the databases listed above may be combined into a single database and/or additional databases. Moreover, a variety of other date storage solutions may be utilized in connection with embodiments disclosed herein.

The work layer 302 may, among other things, manage the system, conduct collaborative analytics by system users, integrate with other instances of the system or other external systems, and/or provide a variety of services in connection with available data streams. In certain embodiments, the work layer 302 may offer services that allow for configuration of data collection, data transformations, and/or computations performed by the dataflow layer 304. Further services may include data management services such as management of data packages, projects, data folders, metadata contents, and/or the like. The work layer 302 may further include other data security services including, for example, management of domains and/or authorization rights.

In certain embodiments, the work layer 302 may provide collaboration services, visualization services, and/or analytics services. Collaboration services in connection with data streams may include, without limitation, commenting, editing of metadata, and/or cross-referencing data. Visualization services may facilitate, without limitation, the creation, access, and/or interaction with maps, device locations and/or trajectories, time-series graphs, temporal coverage graphs, spatial coverage graphs, vector graphics, heat maps, quiver plots, streamline graphs, and/or any other type of visualization. Analytics activities may include, without limitation, spatio-temporal queries of data, creation of reports, and/or other analyses of data.

As an example, embodiments of the disclosed systems and methods may be utilized in connection with offshore oil and gas exploration and production and/or maritime transportation and/or agriculture. Such industries may be highly affected by environmental conditions. Services offered by the work layer 302 may be utilized to provide vessel managers, land farmers, oil and gas rig operators, etc. with access to real-time and/or periodic climate statistics, forecasts, hindcasts on environmental conditions, such as wind, wave, ice, and/or ocean current conditions and/or any other parameter of interest (e.g., soil moisture). Results of services performed using the work layer 302 may be delivered to users via the web, a mobile electronic device, a computer system, e-mail, and/or any other user interface. Additionally or alternatively, results of services performed using the work layer 302 may be reported to one or more systems and/or devices for use in connection with making automated control decisions based on the results. As another example, services offered by the work layer 302 may be utilized to analyze and/or identify locations meeting certain criteria specified by a user and/or a system (e.g., climatological conditions in a marine area that may accommodate an aquaculture farm, optimal access location to natural resources below a layer of liquid(s) and/or solid material(s), recommended biological species and/or schedules for cultivating and/or growing in a particular location on land or in water, etc.).

Although not illustrated specifically in connection with FIG. 4, in certain embodiments, some or all capabilities of the dataflow layer 304, the storage layer 306, and/or the work layer 302, may be included as part of an analytics layer. The analytics layer may perform certain analytics related services including, without limitation, querying and analyzing datasets with custom analytics, quality analysis, analytical visualizations, and/or data alert and/or notification creation.

Figure 5:
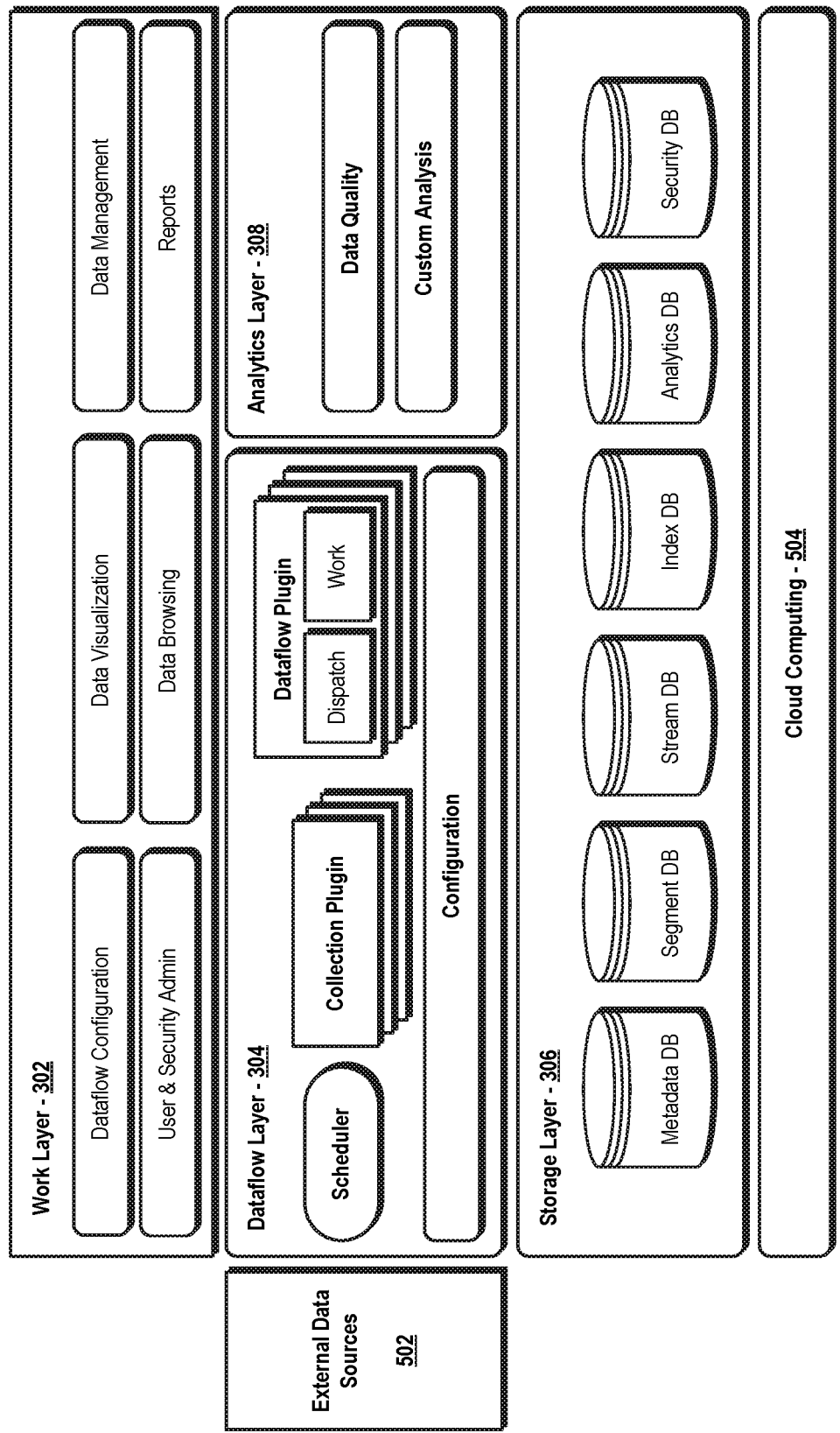
FIG. 5 illustrates another exemplary software architecture implementation of a spatio-temporal data platform consistent with embodiments of the present disclosure.

FIG. 5 illustrates another exemplary software architecture 500 implementation of a spatio-temporal data platform consistent with embodiments of the present disclosure. In certain embodiments, the illustrated architecture 500 may be utilized in connection with performing certain operations in connection with the exemplary flow of data illustrated in FIG. 4.

As illustrated, the work layer 302 may include, among other things, software-implemented methods for configuring functions performed by the dataflow layer 304, methods for generating visualizations of available data, methods for managing data, methods for administering a user's profile (e.g., identification information associated with a user) and/or security information (e.g., security information relating to authentication of user rights to access certain data), methods for browsing data, methods for generating reports relating to data, and/or the like. Methods provided by the work layer 302 may be utilized in connection with data and/or other information associated with the dataflow layer 304, the storage layer 306, and/or the analytics layer 308.

The dataflow layer 304 may interface with one or more external data sources 502 and process data collected by the data sources 502. In certain embodiments, the dataflow layer 304 may utilize a scheduler in connection with processing and/or transforming data collected by the data sources 502 using one or more collection plugins and/or dataflow plugins. In certain embodiments, the one or more dataflow plugins may include dispatch and/or work functionality. In certain embodiments, the data sources 502 may include one or more additional instances of the disclosed platform.

In certain embodiments, data processing steps may be performed by dispatcher component(s), responsible for data flow control, and/or worker component(s), responsible for performing data transformation tasks. An exemplary dispatcher component may contain flow logic to decide when a new data product can be calculated (e.g., realizing logical condition and/or barrier logic). When preconditions are met, the dispatcher may issue one or more work tokens denoting data transformation tasks from one data stream to another. The work token may be utilized by the worker component, which may run relevant data transformation algorithm(s) and produce a new data product into one or more target streams.

The storage layer 306 may implement one or more databases, including any of the databases described above. In certain embodiments, aspects of the storage layer 306 may be implemented using a cloud computing infrastructure such as, for example, an AWS cloud. In further embodiments, some or all cloud computing infrastructure may be provided by a private cloud and/or a hybrid cloud.

The analytics layer 308 may include, among other things, software-implemented methods for performing data quality and/or other custom analytics processes that may be based on data associated with the dataflow layer 304, the storage layer 306, and/or the analytics layer 308. Exemplary processes performed by methods associated with the analytics layer 308 may include, without limitation, detection of unreliable data points, detection of errors in data and outliers based on rules and thresholds defined based on the data. For example, in the case of spatio-temporal data measured by devices conducting observations of an environment like space, atmosphere, Earth's crust, soil, and/or ocean, the data quality could be analyzed based on known physical properties of the environment to identify, highlight, and/or distribute deviations in expected data to user(s) and system(s).

Further processes performed by methods associated with the analytics layer 308 may include computation of statistical metrics for a particular space and/or time region associated with data and provisioning the results of such computations to, for example, services associated with the work layer 302. In certain embodiments, analytic methods performed by the analytics layer 308 may be automated using rule-based and/or machine learning and/or numerical simulation methods and/or any other computational method that can be used to ensure quality and/or perform analytics on data. As an example, data may be compared to previous data in spatially and temporally-related areas to identify extreme values, errors (e.g., failure of a sensor), data source events (e.g., maintenance of a sensor and/or a device), environmental events (e.g., storms and/or tsunamis), and/or trends in the data.

Data Warehousing Flow

Figure 6:
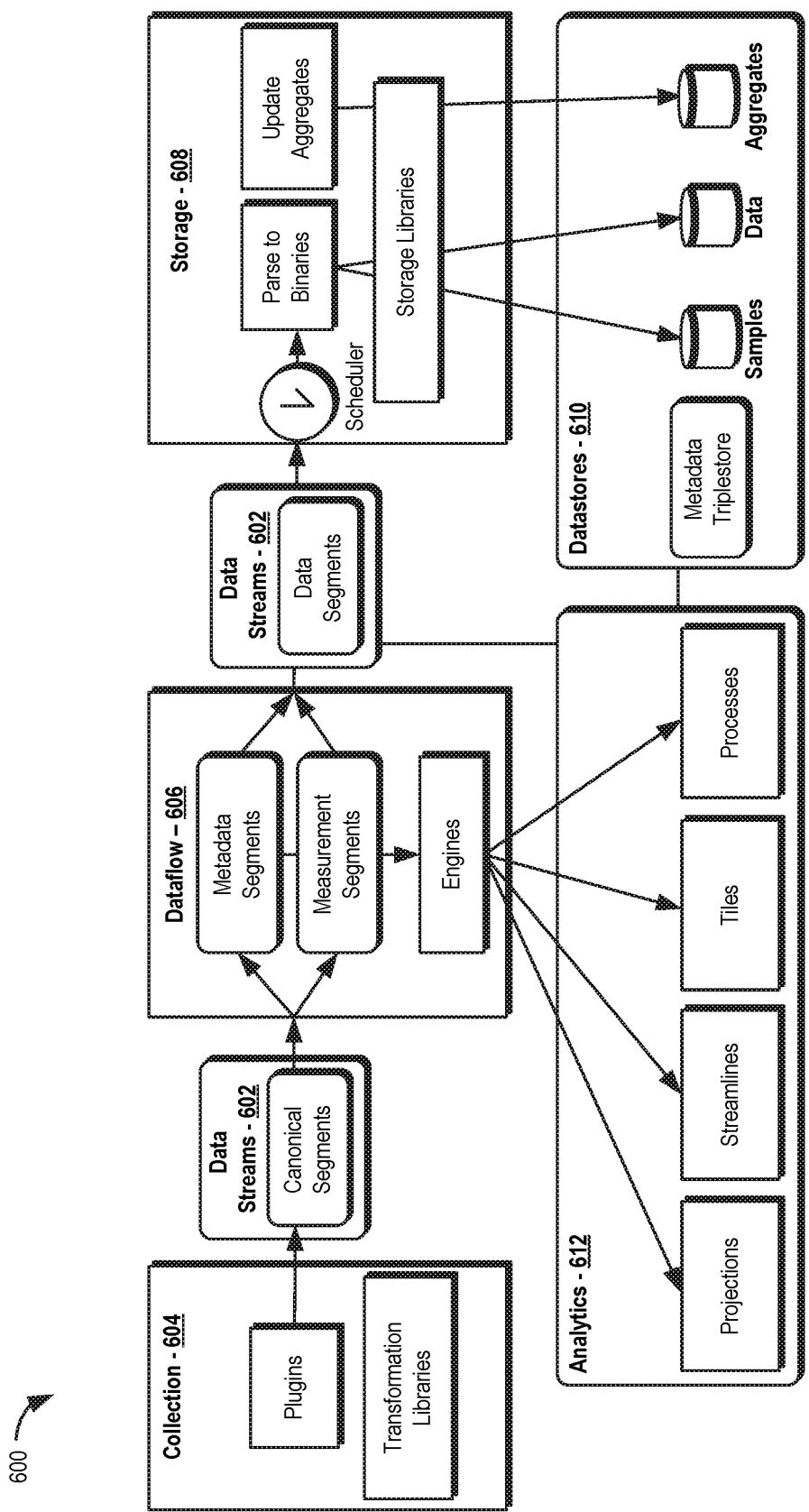
FIG. 6 illustrates a diagram showing an exemplary flow of data in connection with data warehousing operations consistent with embodiments of the present disclosure.

FIG. 6 illustrates a diagram 600 showing an exemplary flow of data in connection with data warehousing operations consistent with embodiments of the present disclosure. Data stream 602 contents may be represented as segments, where canonical segments may represent data output by collection plugins of data collection processes 604. In some embodiments, canonical segments and/or any other segments may be solved, at least in part, with alternative means of exchanging data between processes including, for example, a persistent queue (e.g., a transaction log as implemented in Kafka). In certain embodiments, collection processes 604 may utilize one or more transformation libraries to be used in connection with the collection plugins for reuse of data integration, transformation, and/or processing methods. Dataflow processes 606 may extract data from canonical segments to generate metadata segments and measurement segments. The metadata segments and measurement segments may be processed by the dataflow processes 606 into data segments that may be stored in one or more databases by associated storage processes 608. Certain of the illustrated data warehousing operations may be revertible and/or otherwise undoable.

In certain embodiments, certain data may be utilized in connection with one or more analytical processes 612. In certain embodiments, data extracted into the system may be processed by the dataflow processes 606 using one or more engines providing one or more analytical processes 612. Analytical processes 612 may comprise a variety of analytical methods including, without limitation, the following:

Projections—Projection engines may allow for transformation of spatio-temporal (e.g., geospatial) data from one projection to another other (e.g., from a Mercator to a Lambert projection or the like).

Streamlines—Streamline engines may be utilized in connection with generating visualizations (e.g., a heatmap visualization) relating spatio-temporal data associated with a fluid (e.g., the ocean). Such visualizations may be utilized to visualize the path of a particle in a fluid relative to a solid body past which the fluid is moving (e.g., in smooth flow without turbulence).

Tiles—Tile engines may compute a two or more dimensional visualization of a map representing a surface and/or a slice and/or a volume of a solid or fluid object (e.g., a region in the ocean and/or atmosphere and/or land). The visualization may provide different colors to different values of data in a particular space time region or use any other means to highlight differences in data in a spatial or temporal dimension.

Processes—Processes engines may allow for calculation and/or analysis of certain metrics (e.g., quality metrics) associated with data. For example, a processes engine may be utilized in connection with identifying the existence of extreme or outlier values in data.

In certain embodiments, storage processes 608 may employ a scheduler to schedule parsing of data segments into format(s) that can be used for storage in databases and/or used for further processing including, for example, updating aggregate data information (e.g., computing min, max, count, average, standard deviation of a set of values or conduct any other computation process with the incoming data). Storage processes 608 may interact with databases via one or more storage libraries used to translate communication with databases associated with one or more datastores 610 into supported languages by the databases (e.g., a storage library may enable communication with multiple database implementations including, for example PostgreSQL and/or Vertica and/or SciDB implementation of SQL and/or array query language ("AQL") and its extensions and modifications).

Metadata may be stored by datastore 610 and storage processes 608 may provide metadata in a format that can be stored in database implemented as a metadata triplestore and/or a relational database or any other manner of storing metadata. Data stored in the metadata triplestore may be stored in one or more separate database schemas. For example, in the illustrated data flow, embodiments may store data in three separate database schemas: samples, data, and aggregates. Samples may be used for storing samples of data (e.g., in the event an amount of data is too large to be integrated, processed, stored, and/or distributed in its entirety). In some embodiments, such sampling may allow for optimized interaction with web browsers or devices where bandwidth may be limited and only a subset of data is required in connection with user requested methods. In some embodiments, samples may be associated with a particular period (e.g., monthly, daily, hourly, minute, etc.) or other dimension of data in a data stream 602 (e.g., an aerial resolution based sample). For spatio-temporal measurements, samples may be for locations as described above and in case of data representing multiple-measurements at once, samples may be based on a group of related measurements. Data may be used for storing content received in data segments. In the illustrated embodiments, aggregates may be used for storing values computed as part of an aggregation process as described above (e.g, computing minimum, maximum, and/or average values for a particular location in space-time). Further example of aggregates may be information on a number of measurements that satisfy a particular constraint (e.g., data for a given day/month, for a particular project or parameter type, etc.).

In certain embodiments, a segment manager (not illustrated) may be utilized to maintain a mapping between keys (i.e. arbitrary identifiers for any form of data utilized in connection with the disclosed systems and methods) and segments (e.g., large binary objects) and a reference count or any other information related to a segment. The segment manager may be in communication with any of the other illustrated processes and data maintained by the segment manager may be stored in an associated segment database. In certain embodiments, when a reference count associated with a segment reaches zero, the segment may be deleted (as may be the case in the event of a repair) and/or a reversion of streams may be conducted. The segment manager may further conduct segment caching operations and segment replication with and between domains.

A replication manager (not illustrated) may be utilized in connection with replicated data in different models by creating queues of modification events that may be relayed to subscribers of the queues. The replication manager may be in communication with any of the other illustrated processes and may have access to one or all available datastores 610. The replication manager may further be configured to replicate data across different instances of databases.

In certain embodiments, data collection processes 604 may be orchestrated by a collection manager using, for example, implementing pull and/or push interfaces. In certain embodiments, collection plugins managed by the collection manager may include descriptions on how data from data sources is fetched (e.g., from an FTP server directory every hour or the like). In some embodiments, a channel associated with a data stream 602 may include configuration information regarding how to parse incoming data in custom formats (e.g., CSV, GRIB, NetCDF) into standard formats (e.g., NetCDF4) while preserving original content as much as possible. Data transforms included in the transformation libraries may be specified in a declarative or semi-declarative way regarding how to transform canonical stream segments into metadata segments and measurement segments. Canonical segments may include a sequence of segments in a standard parsed data format (e.g., NetCDF) and may be deleted or replaced by new segments allowing for data repairs. In other embodiments, the data may not be transformed from a collected format and instead computations may be performed directly on the collected data and/or incoming data stream, for example, by using one or more plugins that gradually learn and improve the manner in which content is parsed to one or more specific types of data streams and using the output of the parsing as an input for any other processing methods described herein.

In certain embodiments, the collection manager may operate as a server process. In such embodiments, the collection manager may load existing channel configurations and periodically run collection plugins according to scheduling settings. In certain embodiments, plugins may be run in a spawned process that may be from a different deployment than the collection manager itself.

Dataflow process 606 may be implemented using a dataflow manager configured to organize processes that consume stream logs related to data streams 602 and generate stream logs for outgoing data streams 602. In certain embodiments, stream logs may include sequences of entries in of the form: INSERT(segment) or DELETE(previous_entry_id). Each stream log may have an associated time period that, in some embodiments, may not overlap within a stream. Among other things, the dataflow manager may allow stream repairs to be performed including deleting a segment and inserting a recomputed version of it, which may trigger repairs of streams that depend on the stream that is repaired.

In certain embodiments, a dataflow manager may be implemented as a server process, which may read channel configurations from a database and according to stream states. The dataflow manager may further respond to database notifications regarding new entries inserted into stream logs by running data transformation plugins.

Storage process 608 may be implemented using a storage manager configured to consume data streams 602 provided by the dataflow manager and create operational representations of the data contained in them. In certain embodiments, the operation representations may enable queries and/or other data processing activities with the data.

Platform API for Interacting with Data

Figure 7:
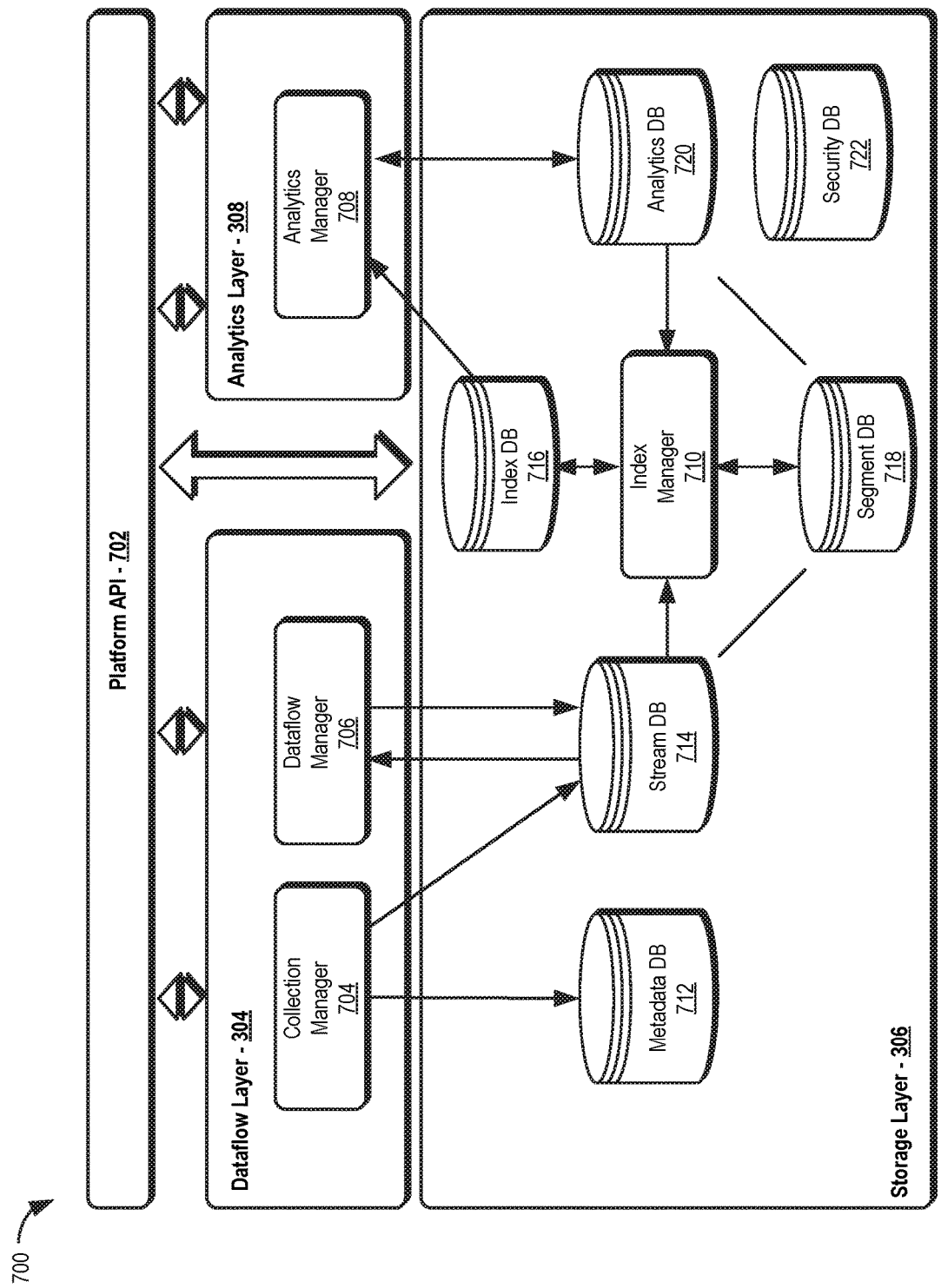
FIG. 7 illustrates an exemplary software architecture implementation of a spatio-temporal data platform including a platform application programming interface consistent with embodiments of the present disclosure.

FIG. 7 illustrates exemplary software architecture 700 implementation of a spatio-temporal data platform providing programmable system interface as a platform API 702 consistent with embodiments disclosed herein. The platform API 702 may comprise an interface that may be used by systems (e.g., cloud-based systems) and/or devices and may utilize a variety of APIs (e.g., APIs using REST architecture, SOAP, Web Services, Enterprise Service Bus protocol or any data exchange protocol designed to provide means for system to system and/or process to process communication). Embodiments disclosed herein may be deployed onto any device or a set of devices capable of computing and storing data and providing means for accessing the data via an API.

A collection manager 704 of a dataflow layer 304 may collect data from one or more data sources and populate a metadata database 712 and a stream database 714 with the collected data. In certain embodiments, the metadata database 712 and/or the stream database 714 may be implemented as relational databases (e.g., PostgreSQL), although other types of database implementations are also contemplated. A dataflow manager 706 of the dataflow layer 304 may compute new data streams based on streams available in the stream database 714, which may be indexed by an index manager 710 that may store resulting indexes and/or other information relevant for accessing the data in an index database 716. In certain embodiments, the index database 716 may be implemented as a combination of in-memory storage (e.g., PostgreSQL buffer) and a database (e.g., a Vertica columnar database), although other implementations are also contemplated. Any subset of the described databases may be combined into a single database and/or other databases may be used for alternative implementations of the embodiments.

Data streams may consist of segments that may be stored in a segment database 718. In certain embodiments, the segment database 718 may be implemented using a relational (e.g., PostgreSQL) database, file system (e.g., NSF) and storage solutions (e.g., S3, EBC, Glacier cloud services) and/or any other storage technology. Segments stored in the segment database 718 may be exchanged with the stream database 714 and an analytics database 720 for certain processing needs.

In certain embodiments, computed values based on segment content and/or any other data stored by the analytics database 720 may be implemented using an array-based database (e.g., SciDB) and the related processes may be managed using an analytics manager 708 associated with an analytics layer 308. The analytical results may be in turn be indexed to be processed in subsequent computations. In further embodiments, the architecture 700 may include a security database 722 (e.g., a database implemented using PostgreSQL and/or its extensions/modifications) that may be configured to control what processes may access what data and what requests arriving via Platform API 702 may initiate processing or access responses to those requests. In alternative embodiments, security may be implementing using cell-level security mechanisms (e.g., as implemented in Apache Accumulo) and/or any other means of ensuring different access rights to different subsets to data in the databases and/or data streams and/or parts of the system.

A variety of system entry points may be designed into the dataflow layer 304, the storage layer 306, the analytics layer 308, and/or any other component of the system. Entry points may comprise functions that interact, initiate or control a particular process or sub-process or a set of processes of the embodiments disclosed herein. System entry points may form a hierarchical network where one function represented by an entry point depends or calls one or more other functions.

Real Time Integration and Processing of Data

Figure 8:
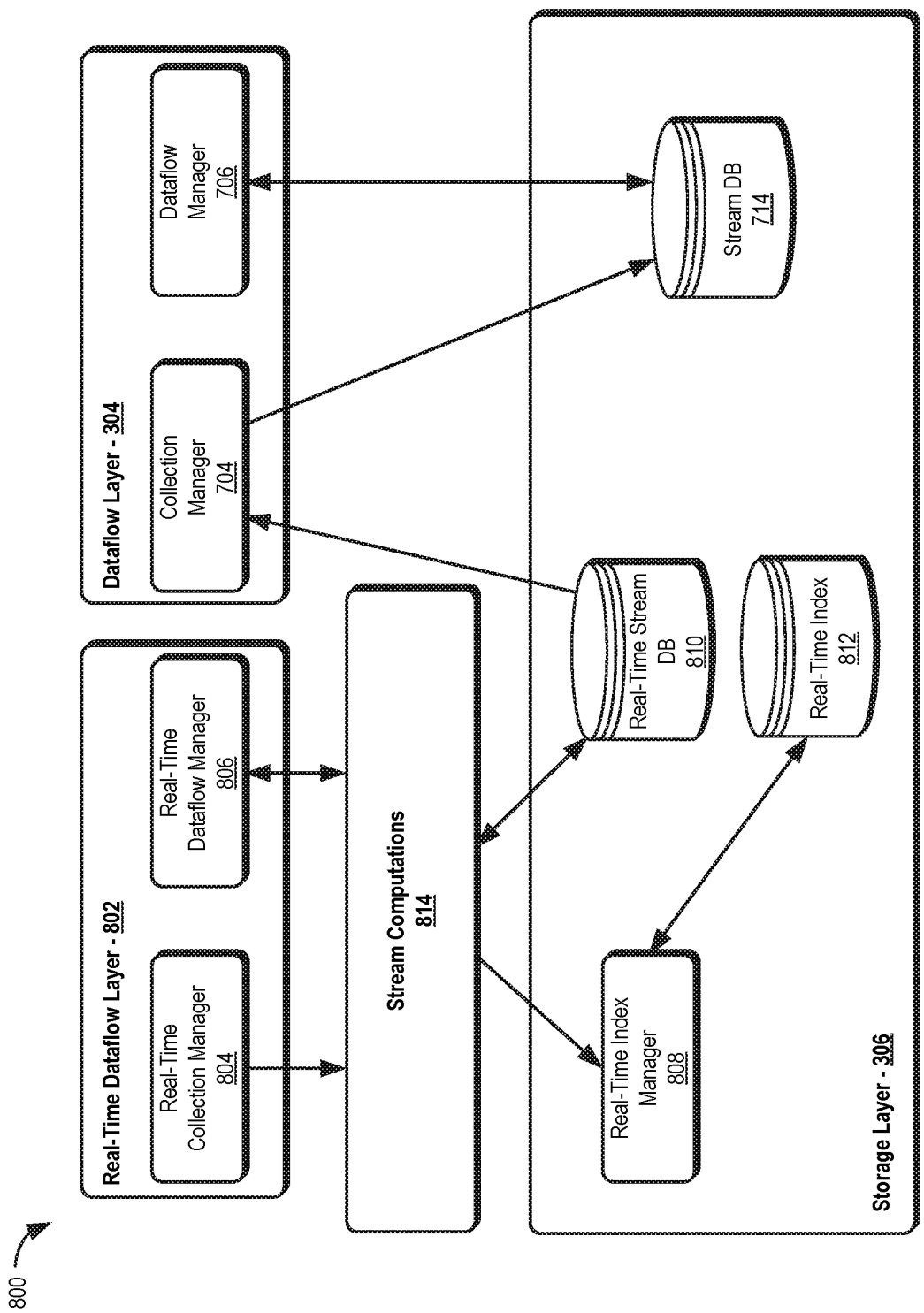
FIG. 8 illustrates an exemplary software architecture implementation of a spatio-temporal data platform including real-time data integration and processing consistent with embodiments of the present disclosure.

FIG. 8 illustrates an exemplary software architecture 800 implementation of a spatio-temporal data platform including real-time data integration and processing consistent with embodiments disclosed herein. A real-time collection manager 804 of a real-time dataflow layer 802 may be used to collect data at real-time speed into a stream computations component 814. In certain embodiments, the stream computations component 814 may be implemented using distributed and/or fault-tolerant real-time computation systems that may be further extended with abstractions tailored for real-time computing. In some embodiments, to provide for real-time input for the stream computations component 814, a high-throughput distributed messaging system may be used to publish and subscribe to messages exchanged between different components using a distributed commit log (e.g., Apache Kafka). For integrating real-time processes in the stream computations component 814, a transport layer implemented as a socket library acting as a concurrency framework may be used. A real-time dataflow manager 806 may combine multiple streams in the stream computations component 814 into one that may, among other things, be utilized in connection with other streams.

In some embodiments, if a data source provides data at a high frequency in time and/or space, additional sampling, aggregation, and/or pre-processing may be conducted by the data source or at a time prior to the data being provided to the real-time collection manager 804. Such pre-processing may include processing by one or more machine-learning algorithms, rules, and/or schedules of devices that aggregate, sample, and/or detect when data should be sent to other systems. For example a buoy detecting whales based on sound recordings may send data only when a potential audio sample has been found that contains a candidate whale voice. Messages may be passed between different states of the platform using a low-latency and high-throughput optimized for specific computer architectures may be used (e.g., using inter-thread messaging libraries).

In some embodiments, data processed and/or intergrated by the stream computations component 814 may be indexed by a real-time index manager 808 that may store resulting indexes in a real-time index database 812 and real-time streams in a real-time stream database 810. The real-time index database 812 may utilize one or more database technologies designed for high-speed operation work (e.g. VoltDB). The real-time stream database 810 may utilize one or more non-relational distributed database models (e.g. Apache HBase). Data available in the real-time stream database 810 may be provided to other components and/or databases in connection with embodiments disclosed herein.

Collaborative Analytics, Processing, and Interactions with Data

Figure 9:
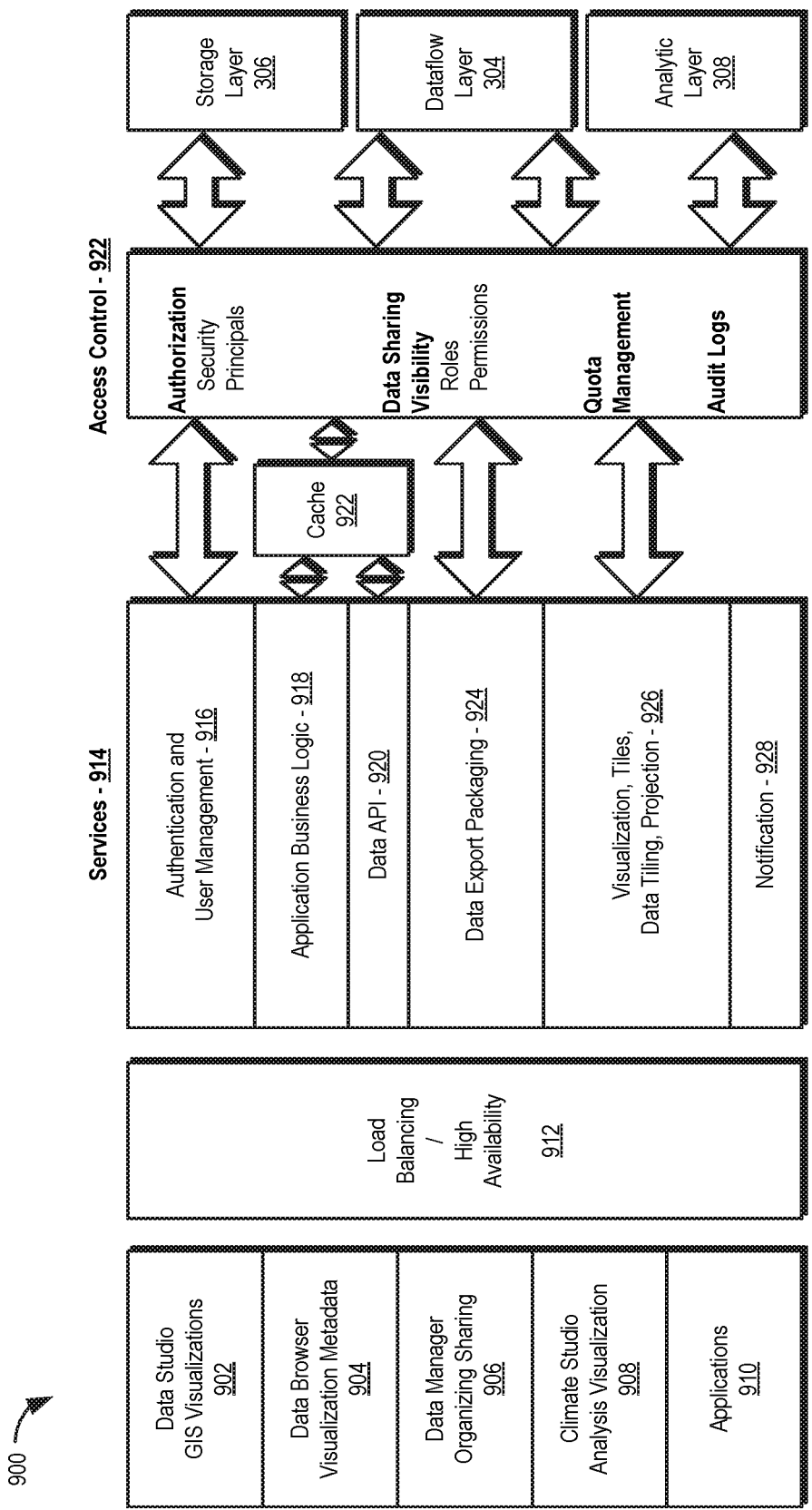
FIG. 9 illustrates an exemplary software architecture implementation of a platform for interacting with spatio-temporal data consistent with embodiments of the present disclosure.

FIG. 9 illustrates an exemplary software architecture 900 implementation of a platform for interacting with spatio-temporal data consistent with embodiments disclosed herein. In certain embodiments, the illustrated architecture 900 may, among other things, interact with data associated with one or more storage layers, one or more dataflow layers, and/or one or more analytics layers (e.g., accessible using a platform API or the like) as described above. Moreover, the illustrated architecture 900 may allow a user to work with such data and/or collaborate with other users and/or systems.

In certain embodiments, the architecture 900 may employ one or more frontend components and/or interfaces 902-910 for collaborative interaction, distribution and processing of data. In certain embodiments, the frontend components and/or interfaces 902-910 may provide embodiments of a visual explorer service and/or interface as described above.

Exemplary frontend components and/or interfaces 902-910 may include, without limitation:

- Data studio—A data studio component 902 may allow a user to perform geographic information systems ("GIS") operations and/or visualizations on the data (e.g., using a visual explorer interface and/or the like).
- Data browser—A data browser component 904 may allow a user to access metadata and/or aggregate visualizations relating to data and/or metadata.
- Data manager—A data manager component 906 may allow for organizing and sharing data streams and/or other data (e.g., sharing between users or the like).
- Climate studio—A climate studio component 908 may be used for analyzing data and/or visualization results.
- Applications—A variety of other applications 910 may be utilized to interact with data that, in some embodiments, may be specialized for a particular industry. Exemplary applications include, without limitation, a sound studio for interacting and processing acoustic spatio-temporal data via a user interface, an application for accessing and working with interpolated spatio-temporal data, an application for conducting validation and verification activities on data, data sources and related data streams, an application for finding, optimizing, planning and monitoring recommended routes for mobile devices through a dynamic environment, and/or the like.

The frontend components and/or interfaces 902-910 may be implemented using a variety of suitable technologies (e.g., web technologies such as HTML5, Javascript, D3, Backbone, leaflet, ArcGIS, etc.). In some embodiments, the frontend components and/or interfaces 902-910 may be provided on one or more servers that may be accessible via load balancing and/or high availability interface solutions 912 such as, for example, a TCH/HTTP load balancer or the like.

In some embodiments, functions of the frontend components and/or interfaces 902-910 may be based on one or more services 914. Services 914 may include, without limitation, services related to authentication and user management 916, application business logic services 918 that may implement routines, procedures, and/or methods specific to a functionality that a frontend component provides, and/or data API services 920 that may provide a way to access data by the frontend components and/or interfaces 902-910 and/or from other systems via define standard data exchange interfaces (e.g., OpenDAP). In certain embodiments, the application business logic services 918 and/or the data API services 920 or any other services may depend on one or more caches 922 to store frequently accessed data in a form that does not require accessing other parts of the system. As an example, a dataset related to the Mexican Gulf measuring atmospheric and oceanic processes on a particular day may be cached.

Further exemplary services 914 may include data exporting and packaging services 924 that perform such activities in the event data is extracted and/or downloaded from the system. Data exporting and packaging services 924 may further provide asynchronous updates to frontend components 902-910 to update user interface components accordingly. In some embodiments, asynchronous updates may be used to exchange information between frontend components and any other services. A further exemplary service may include a visualization, tile, data tiling, and/or projection service 926 configured to provide a variety of projections of visualizations. For example, in the case of geospatial data relating to the Arctic, a Lambert projection of the data may be provided by the visualization, tile, data tiling, and/or projection service 926. A notification service 928 may be used to exchange one or more notifications between frontend components and/or interfaces 902-910.

An access control layer 922 may be utilized between a platform based API access or direct access to a storage layer 306, a dataflow layer 304, and/or an analytics layer 308. The access control layer 922 may be configured to, among other things, ensure proper authorization for functions of the platform API and/or data by utilizing one or more security rules and/or principals, facilitating data sharing visibility for links based on a user (e.g., an individual user, group, and/or system) rules and/or permissions, manage quotes of system use, and/or collect audit logs for activities.

Figure 10:
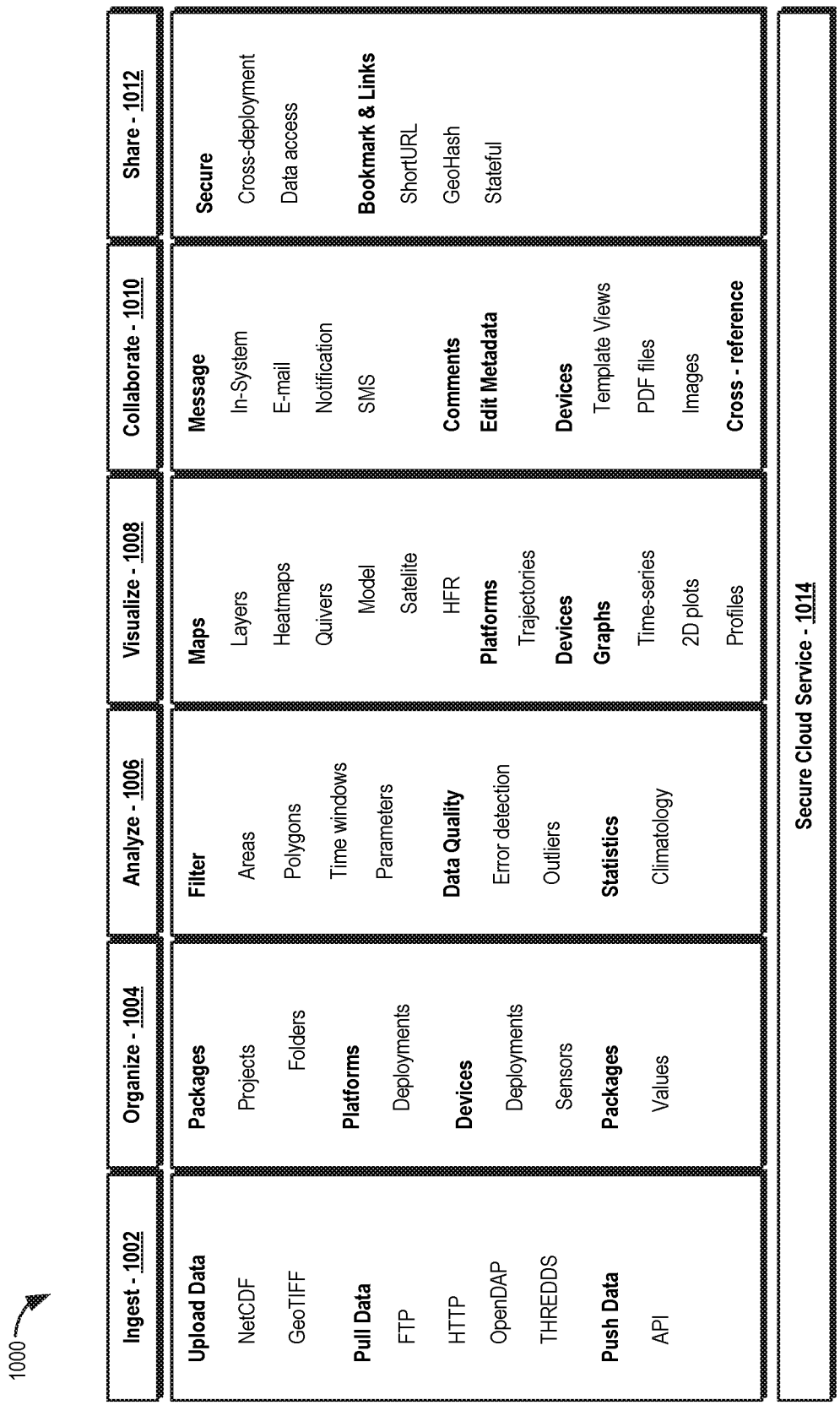
FIG. 10 illustrates a variety of exemplary functions a user may utilize in connection with spatio-temporal data consistent with embodiments of the present disclosure.

FIG. 10 illustrates a variety of exemplary functions 1000 one or more users may utilize in connection with spatio-temporal data consistent with embodiments disclosed herein. In certain embodiments, the illustrated functions 1000 may be associated with functionality of services offered by a work layer. In further embodiments, the functions 1000 may facilitate collaborative interactions between users and/or systems.

Exemplary functions 1000 may include data ingest services 1002, data organize services 1004, data analyzing services 1006, data visualization services 1008, collaboration services 1010, and/or sharing services 1012. Data ingest services 1002 may provide functions relating to uploading data, pulling data, and/or pushing data to other services and/or systems. Data organize services 1004 may include services relating to data package management (e.g., creation and/or management of projects and/or folders), platform and/or deployment organization and/or management, device organization and/or management (e.g., management of device deployments and/or associated sensors), and stream organization and/or management. Data analyzing services 1006 may provide data filtering services (e.g., filtering by areas, defined polygons, time windows, parameters, etc.), data quality services (e.g., detection of errors and/or outliers), and/or statistic services (e.g., statistical climatological analyses). Data visualization services 1008 may include mapping services (e.g., layer maps, heat maps, quiver graphs, etc.), platform visualization services (e.g., trajectory visualizations), device visualizations, and/or graphing services (e.g., time series, plots, profiles, etc.). Collaboration services 1010 may include messaging services (e.g., in-system messaging, e-mail, notification, SMS, etc.), commenting/metadata editing services, device-based collaboration services, and/or cross-referencing services (e.g., data, device, etc.). Sharing services 1012 may include secure sharing services (e.g., data access services) and/or bookmarking and/or linking services. In certain embodiments, functions 1000 may be offered as part of a cloud-based services 1014 providing abstraction for managing and meeting service-level agreements and/or security targets.

Processing and Analysis of Data

In some circumstances, measurements performed by sensors may be available only in specific space-time points. For points in space-time without measurements, associated data may be computed by applying methods, techniques, and/or software packages related to, for example, data mining, machine learning, and/or numerical simulation. Examples of such methods may include, among other things, numerical models related to computational fluid dynamics and/or numerical models of atmosphere, ocean dynamics and/or seismic models. Alternative methods may be used to model ensembles combining different models into a single result or sets of results and/or a value distribution for each space-time point. An example of processing and analysis could be determining optimal navigation path based on environment forecast and/or hindcast and dynamics given a specific departure location and/or date and destination with/without a date. An example of such process and analysis includes using of historical trajectories of mobile devices (e.g., ships) and averaging a result for estimated weather conditions.

Producing data values for points in space-time regions without measurements may depend on one or more thresholds for data consistency for specific applications of the data collected. The thresholds may be defined as a discrete or continuous rank for data and/or data products. An example discrete ranking may be a 5-level discrete binning of data and data products based on an amount of processing, validation and other consistency increasing activities involved. Level 0 may include, for example, raw data and metadata received from a sensor/data source/organization. Level 1 may include, for example, canonical data representing raw data that has been structured into one or more formats supported by the spatio-temporal data platform. Level 2 may include, for example, filtered data where a set of errors and/or inconsistencies have been removed from the canonical data using algorithms/rules/equations. Level 3 may include, for example, derived data product that has been calculated based on filtered data and that can be used in applications. Level 4 may include, for example, trusted data product that has been reviewed/validated by a machine or person to meet specific criteria (e.g., as defined in a definition of trust).

In certain embodiments, processing of environmental data may be based on mathematical equations defined by the physics of an environment and/or other suitable methods (e.g. machine learning methods like neural networks) that can be used for detection of novel and/or outlying data. In certain embodiments, results of such processing may be used as input for other systems including, for example, control systems.

Data Model

Figure 11:
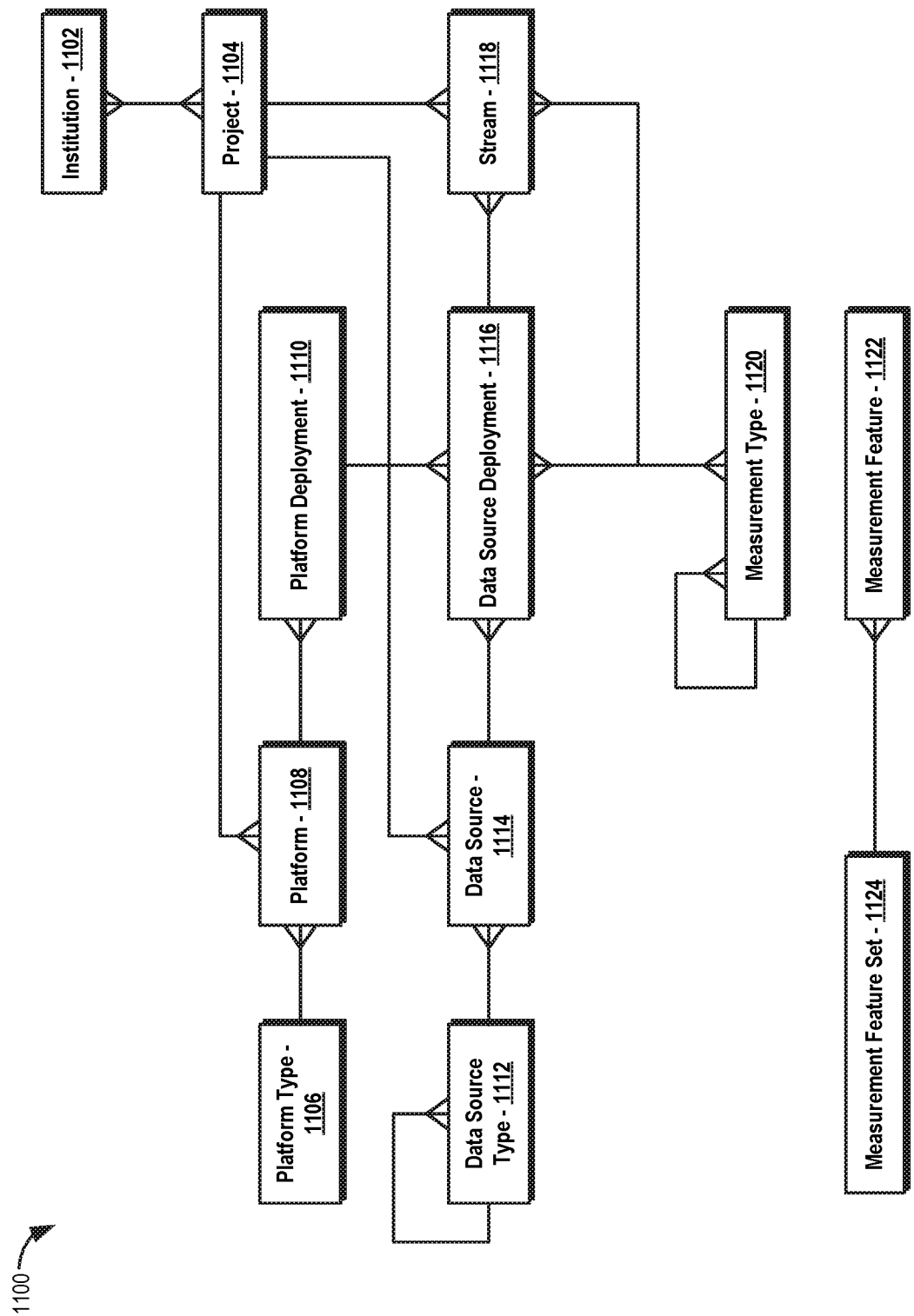
FIG. 11 illustrates an exemplary data model that may be used in connection with embodiments of the systems and methods disclosed herein.

FIG. 11 illustrates an exemplary common data model 1100 that may be used in connection with embodiments of the systems and methods disclosed herein. In certain embodiments, the data model may describe how a meta model (i.e. items 1106, 1112, and 1120) and an entity model (i.e. items 1102-1104, 1108-1110, 1114-1118, and 1122-1124) may store data (e.g., spatio-temporal data or the like) in one or more databases. In certain embodiments, aspects of the data model 1100 may be utilized in connection with oceanic, seismic and/or atmospheric data, but it will be appreciated that the data model 1100 may be extended and modeled to be utilized in connection with other types of data. In an exemplary implementation pertaining to oceanic and/or atmospheric data, the data model 1100 may include, without limitation:

Institution 1102—A person or an organization that owns, manages, and/or controls some asset that may include a platform, instrument or process, data stream, and/or any other content stored in the system. This ownership relation may be indirect, implemented via a project entity. Institutions may have many assets and a single asset may belong to many institutions.

Project 1104—An entity that can create, publish, and/or own an asset that may include a platform, instrument or process, data stream, and/or any other content stored in the system. A project may be a part of one or many institutions. A project with one institution may be considered to be owned by that institution, and the project's assets may be assumed to be owned by the institution.

Platform Type 1106—A description of a platform. Platform types may have attributes attached to them and a set of attribute values may create a platform type. Attributes may be medium, location, dimensions and/or any other attribute relevant to the platform.

Platform 1108—A real-world platform item to which devices (e.g., platforms and/or instruments) and data sources (e.g., instruments and/or processes) may be attached. For example, a name of a ship, satellite, and/or sensor array may be a platform.

Platform Deployment 1110—A temporal activity of a platform with associated configuration and/or data collection (e.g., a name of a ship, a duration of a journey, a journey route, and/or devices associated with the ship).

Data Source Type 1112—A top-level description of a structure of an observing pattern or feature associated with data that may indicate how to interpret the data and/or store the data (e.g., gridded, in-situ, mesh, etc.).

Data Source 1114—An individual concrete or digital item (e.g., an instrument or process) which may generate data (e.g., a specific wind measurement instrument, a specific satellite, etc.).

Data Source Deployment 1116—A temporal configuration of a data source that may have measurement types attached to it. In some circumstances, data streams may be considered to originate from data source deployments.

Stream 1118—Measurements (actual or processed) from the data source (e.g., instrument or process). Each stream may have a defined content, format, and data source. Each data source may produce 1 . . . n streams. In certain embodiments, each stream may be associated with the deployment of the data source on which they were produced.

Measurement Type 1120—What is observed or measured; often called parameter name. Measurement types may represent a scalar or tensor (e.g., a vector with two components, wind speed.X and wind speed.Y) or any other measurement value. Each measurement type may have defined attributes (e.g., units, short label, measurement type group, etc.). Measurement types may not be affected by time or location of the measurement.

Measurement Feature 1122—A flag for a measurement value.

Measurement Feature Set 1124—A collection of measurement features of a similar nature.

Embodiments of the illustrated data model 1100 may be extended with further components including, without limitation:

Data Source Model—A description of a data source.

Data Source Mfg-Model—A categorization of a data source according to its detailed functionality, such that other data sources which share that mfg-model may be able to be functionality interchangeable.

Measurement Type Group—A grouping of multiple measurement types into a single consolidated parameter in the user interface.

Group Type—A high-level parameter grouping in the user interface (e.g., geology and seismograph, physical-atmosphere, physical-water, etc.).

Measurement Value—A particular value at a particular time at a particular place. It may have direct references to the following entities in the data model: x, y, z location; timestamp or any other entity in the data model.

Mapping—A definition as to how to interpret the stream data. May be versioned.

Instrument—A device or sensor that can generate digital data. An instrument may have multiple transducers, each of which transforms an external signal into an electrical signal. An instrument may transform the electrical signals into digital bit streams. A single instrument may output data from its transducers in multiple formats or combinations, each of which may be a data stream.

Data Connection—A source of one or more data streams with common attributes associated with their access point and original data source type. The data streams in the data connection may have separate data sources and data source deployments, but otherwise have common characteristics.

It will be appreciated that a number of variations can be made to the architecture and relationships presented in connection with data model 1100 illustrated in FIG. 11 within the scope of the inventive body of work. Moreover, in certain embodiments (e.g., embodiments not employing databases or where data is processed directly in a format from which it arrives), a common data model may not be used. Thus, it will be appreciated that the illustrated data model 1100 is provided for purposes of illustration and explanation, and not limitation.

Structuring and Storing Data

Figure 12:
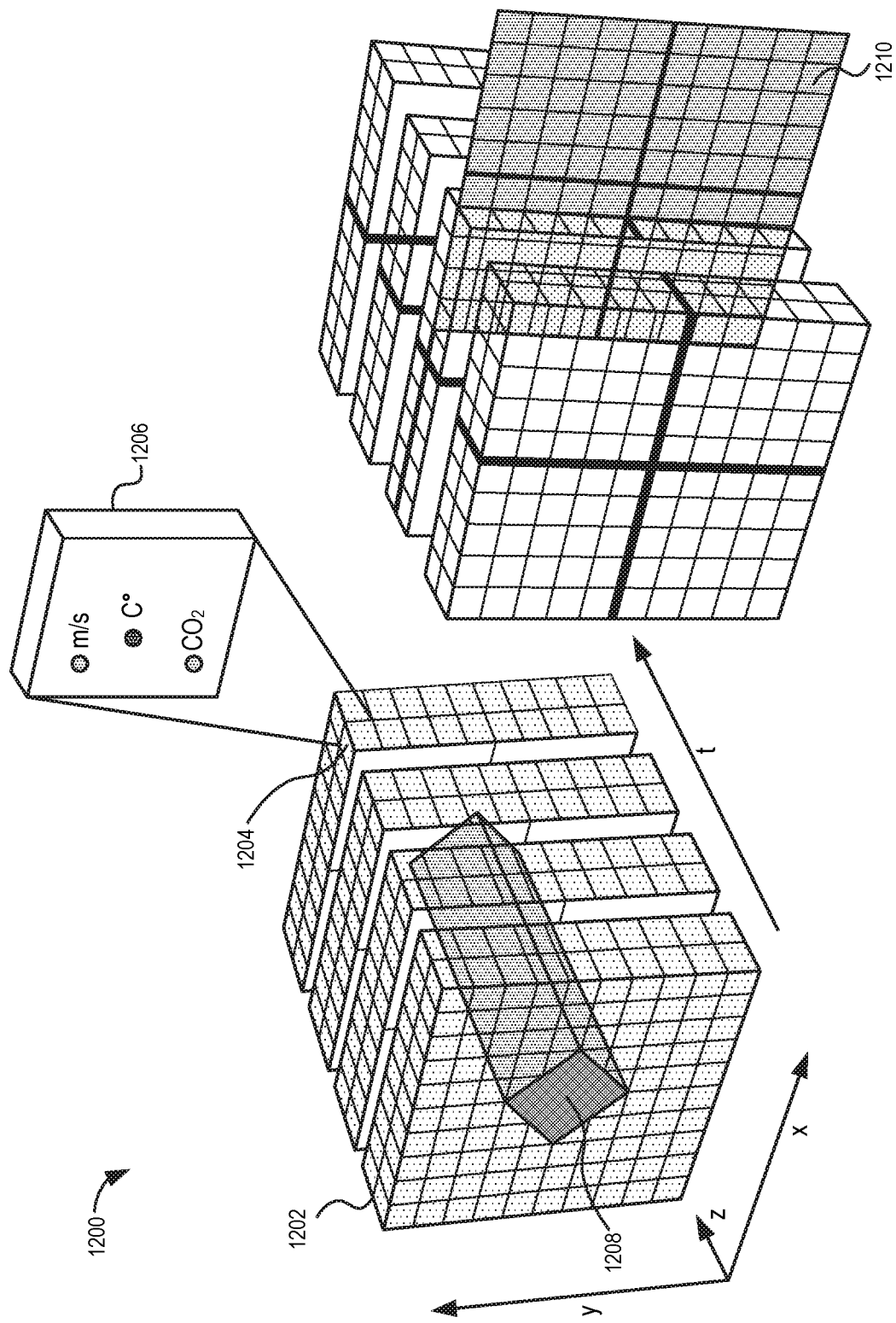
FIG. 12 illustrates a conceptual diagram of an exemplary structure for storing spatio-temporal data consistent with embodiments of the present disclosure.

FIG. 12 illustrates a conceptual diagram of an exemplary structure 1200 for storing spatio-temporal data (e.g., subsets of spatio-temporal data) consistent with embodiments of the present disclosure. For the particular exemplary structure, the data may be structured according to three or more dimensions (e.g., dimensions representing time, space, and/or any other relevant dimension in the data) and resolution of space-time. For example, as illustrated, a set of files and/or their content may be structured according to three dimensions for space and time as shown.

Data access through different files and content are represented by the arranged boxes illustrated in FIG. 12. For example, a larger box 1202 may represent a file, whereas a smaller box 1204 may represent an array and/or a chunk of data 1206 (e.g., a large box as a file, smaller boxes inside the larger one as chunks or arrays of data). A data access query in connection with the illustrated structure may represent a query with a fixed space or a time dimension. For example, a query with a fixed space may be associated with a polygon query 1208 through the structure 1200. A query of a time dimension may be associated with a slice of data 1210 through the structure 1200.

In certain embodiments, data stored by structure 1200 may comprise a multi-dimensional set of measurements for different physical or computed parameters. Data access may be optimized by use of columnar, array storages and/or compressed bitmaps that index the data available in individual files, chunks and/or arrays along with pre-computed statistics that enable queries defining a range or ranges for requested data, or any other means suitable for optimizing data access. Data access may be also optimized by storing samples, aggregates, pre-computed statistics and data values inside the memory of one or more computers associated with one or more computer clusters used by the spatio-temporal data platform.

The illustrated structure 1200 may be utilized in a variety of applications and/or ways. For example, the structure 1200 may be used in connection with interpolation and/or extrapolation for any point in time and/or space. Such interpolation and/or extrapolation may be based on algorithms representing physical processes, simulations, machine generated models, and/or or any other method suitable for calculating a value for a given set of parameters and dimensions to project values in space and time where no or limited observation or data exists.

Figure 13:
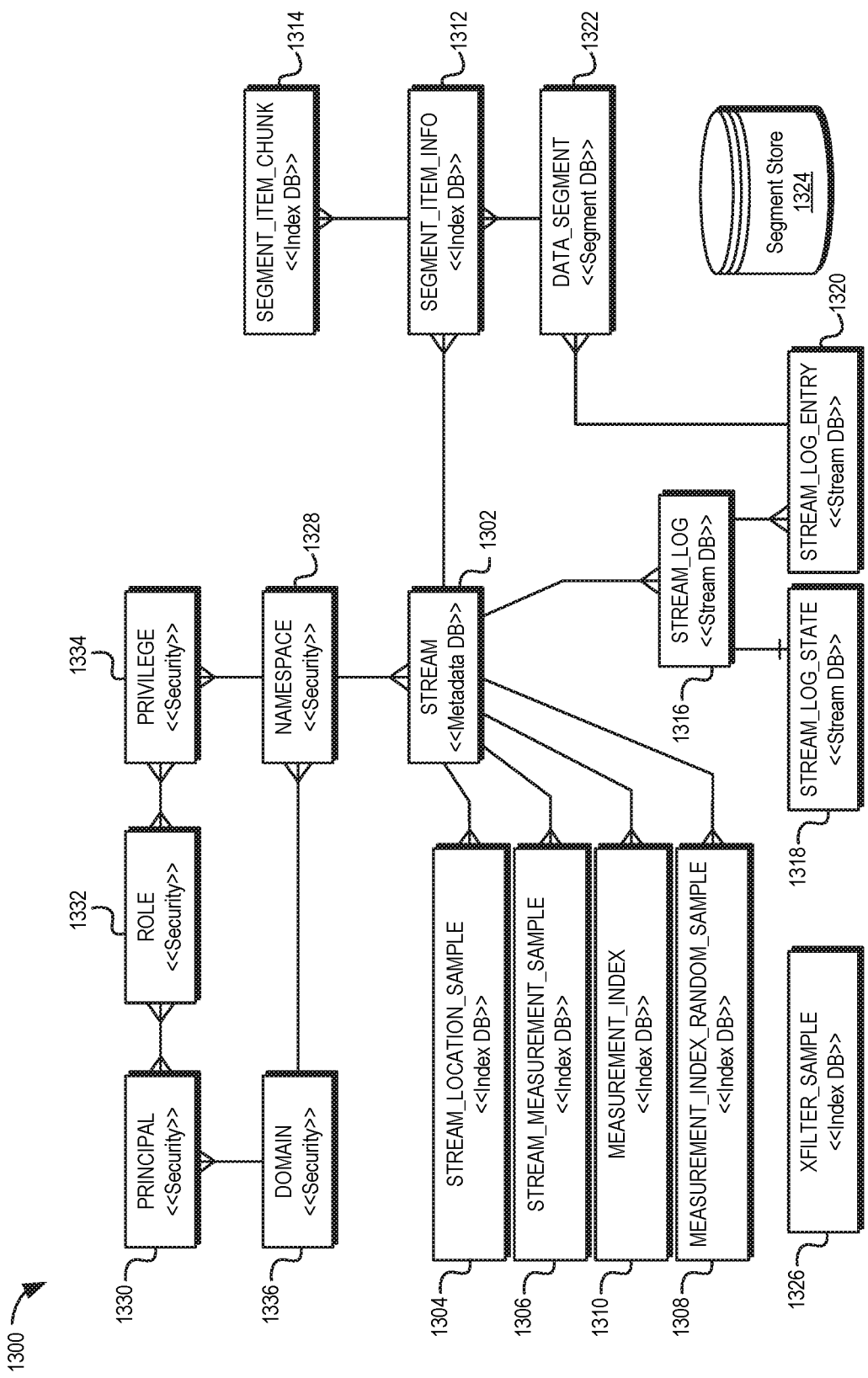
FIG. 13 illustrates another exemplary data model that may be used in connection with embodiments of the systems and methods disclosed herein.

FIG. 13 illustrates another exemplary data model 1300 that may be used in connection with embodiments of the systems and methods disclosed herein. In certain embodiments, the exemplary data model 1300 may help facilitate organization and handling of metadata efficiently. A data stream 1302 may be stored in a metadata database with reference to an index database that contains samples of data in one or more tables 1304-1310. The tables may include a stream location sample table 1304, a stream measurement sample table 1306, a measurement index random sample table 1308, and/or a measurement index table 1310 that may include indexes to individual measurements. Among other things, the tables 1304-1310 may be used to efficiently access point data related to a stream 1302. In case of gridded data types, the index database may further contain tables such as a segment item information table 1312 and/or a segment item chunk table 1314 that contain information about particular parts of a gridded dataset and/or computed and/or collected metadata relevant to the datasets.

In some embodiments, the data stream 1302 may have related entities 1316-1320 stored in tables in a stream database. These tables may include a stream log table 1316, a stream log state table 1318, and a stream log entry table 1320. Entries in tables 1316-1320 may be utilized in connection with implementing stream revertability, repeatability, and/or repair ability and/or to store data relevant to such operations. A segment database stored in a segment store 1324 may further include a link to a data segment table 1322 containing content of a stream or a means of accessing the content of the stream.

In further embodiments, data may be filtered by different dimensions such as, for example, parameters, areas, organizations, and/or other data model entities using information stored in a filter table 1326. In some embodiments, the filter table 1326 may store values (e.g., pre-computed values) about the existence of data for a particular filter combination. In some embodiments, information included in the filter table 1326 may improve effective access to data available in the system.

To implement certain security functionality, the model 1300 may further include a principle table 1330, a role table 1332, a privilege table 1334, a domain table 1336, and/or a namespace table 1328 related to the data stream 1302. In certain embodiments, such information may be utilized in connection with authorizing access to all and/or particular subsets of the data stream 1302. In certain embodiments, security functionality may be implemented in a variety of ways and may be related to individual entities in the data model and/or a physical implementation of storage of the entities.

It will be appreciated that a number of variations can be made to the architecture and relationships presented in connection with the model 1300 illustrated in FIG. 13 within the scope of the inventive body of work. Thus, it will be appreciated that the illustrated data model 1300 is provided for purposes of illustration and explanation, and not limitation.

Data Model API

In certain embodiments, data access from the disclosed data models may be implemented using one or more programmable interfaces to databases. In certain embodiments, such interfaces may have a number of components including, for example, data objects configured to store data in the programming language runtime. Such data objects may be similar to a row in the database. The interfaces may further include one or more data object managers configured to change and/or read data that may utilize references to data. In further embodiments, the interfaces may include one or more domain connections for querying from one or more domains enabling parallel work across instances of the disclosed platform. Data objects may further include one or more interface methods.

Metadata Flow

Figure 14:
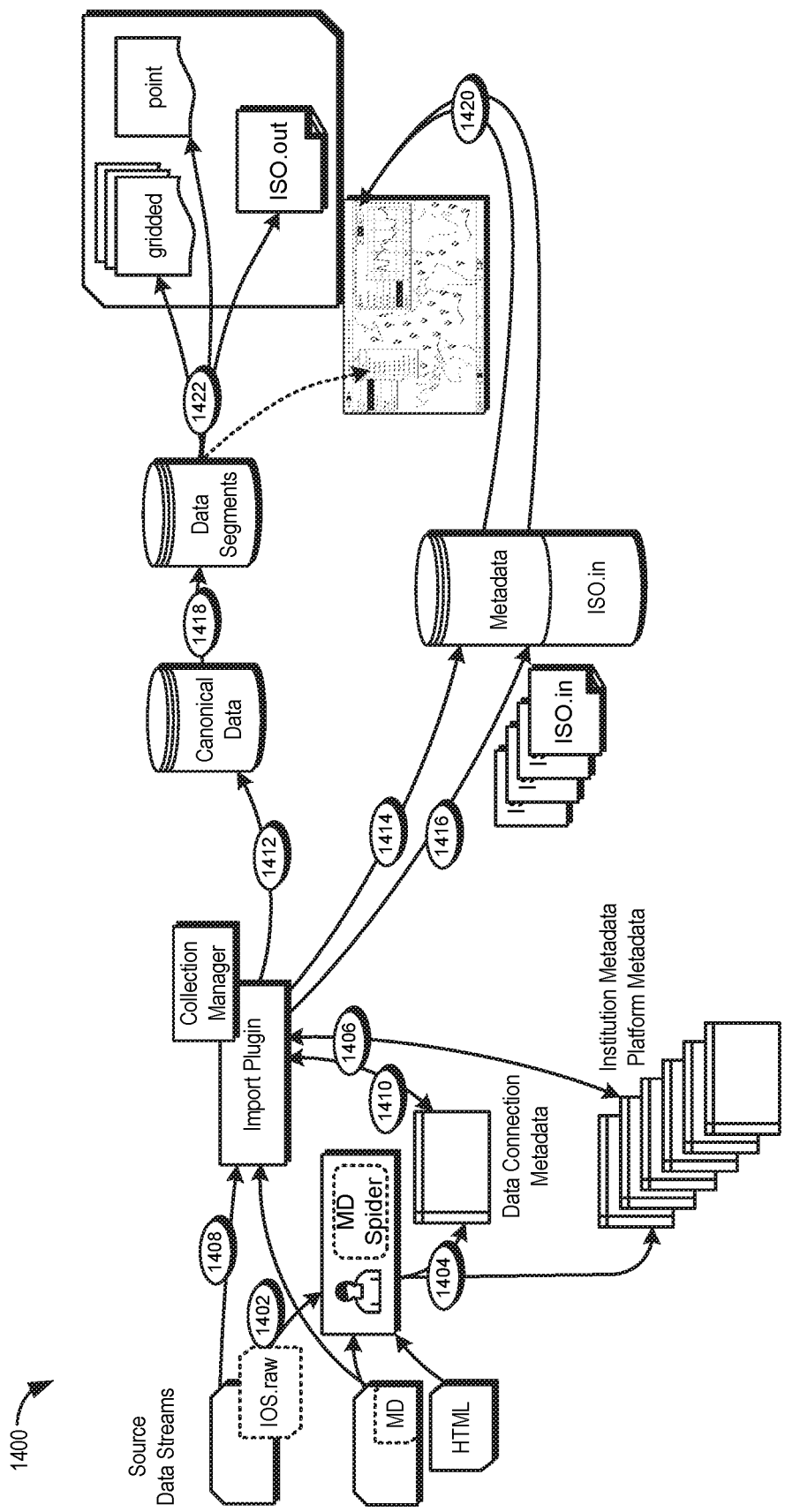
FIG. 14 illustrates a diagram showing an exemplary flow of metadata in connection with the disclosed systems and methods consistent with embodiments of the present disclosure.

FIG. 14 illustrates a diagram 1400 showing an exemplary flow of metadata in connection with the disclosed systems and methods consistent with embodiments of the present disclosure. In certain embodiments, the illustrated flow of metadata may comprise a sequence of actions that may be taken to ensure metadata in a particular standardized form is accessible for use by frontend components (e.g., a data studio and/or visual explorer). Alternative implementations of the metadata flow may be implemented in other embodiments in a manner such that metadata can be related to data stored in databases or in processed in data streams.

At 1402, metadata may be identified from data source documentation (e.g., from HTML, MD, and/or ISO.raw format) either automatically or by a user. In some embodiments, the metadata may be identified by an automated collection process and/or metadata crawler and/or spider. At 1404, metadata tables may be populated with identified metadata by a user or an automated process. For example, data connection, institution, and/or platform metadata tables may be populated with identified metadata.

An import and/or collection plugin (e.g., managed by a collection manager) may read metadata from the metadata tables at 1406. At 1408, the import and/or collection plugin may read data and metadata from a data source and/or data stream. If appropriate, the import and/or collection plugin may update spreadsheet metadata for the data source and/or data stream connection at 1410.

At 1412, the import and/or collection plugin may store data to canonical segments in a metadata database of a storage layer. The import and/or collection plugin may further store metadata in metadata tables in the metadata database of the storage layer at 1414. At 1416, the import and/or collection plugin may compose in a specific form (e.g., ISO 19139 forms, ISO.in) with extended metadata and store the forms in the metadata database of the storage layer. At 1418, processes associated with a dataflow layer may process the canonical segments stored at 1412 into data segments.

Processes associated with a storage layer may place metadata in appropriate locations accessible by frontend components of a data studio and/or a visual explorer at 1420. At 1422, data may be published upon request, including metadata descriptions included in a specific form (e.g., ISO 19139 formats like gridded, point, or ISO.out).

Identified metadata may be automatically evaluated for quality. For example, quality can be calculated as a function of whether a core set metadata is provided, a lower-criticality of metadata is indicated, and/or the metadata that is provided meets certain quality metrics (e.g., URLs are live), conformance is achieved to conventions, standard variables are used for semantic values, and/or the like. In certain embodiments, a quality function may assign a value to identified metadata. For example, points may be assigned to a value if core metadata listed into the system is discoverable or automatically available (e.g., through netCDF, ISO, or another standard format), if metadata is provided that passes any certification tests for a standard, and/or the like. In some embodiments, a threshold may be assigned for values below which associated metadata and/or related data is not collected automatically. The quality function may be rule based, machine-generated, and/or employ any other method to assign values to inputs.

Security Model

A security model may be used in connection with the disclosed embodiments. Alternative security model implementations with varying detail levels for access control may be also be used in connection with embodiments disclosed herein. In some embodiments, the security model may be associated with a domain. A domain may include data created by user that, in some instances, may have many associated domains. A domain may be viewed as one deployment or logical datacenter, although many domains may be included in one server instances as well. In some embodiments, a domain may be associated with a data view (e.g., a view specified by filters, time ranges, polygon areas, etc.). In further embodiments, the data view may be shared with other domains.

In certain embodiments, when data and/or metadata is created, the data and/or metadata may be attached with a domain identifier. Within a security model, data and/or metadata may be owned by an institution and/or a domain. In some embodiments, a domain and an institution may be related whereas in other embodiments, a domain and an institution may be unrelated. In some embodiments, a user only may be able to view data and/or share views of data that is created within a domain they are associated with or that they have been allowed access to.

Figure 15:
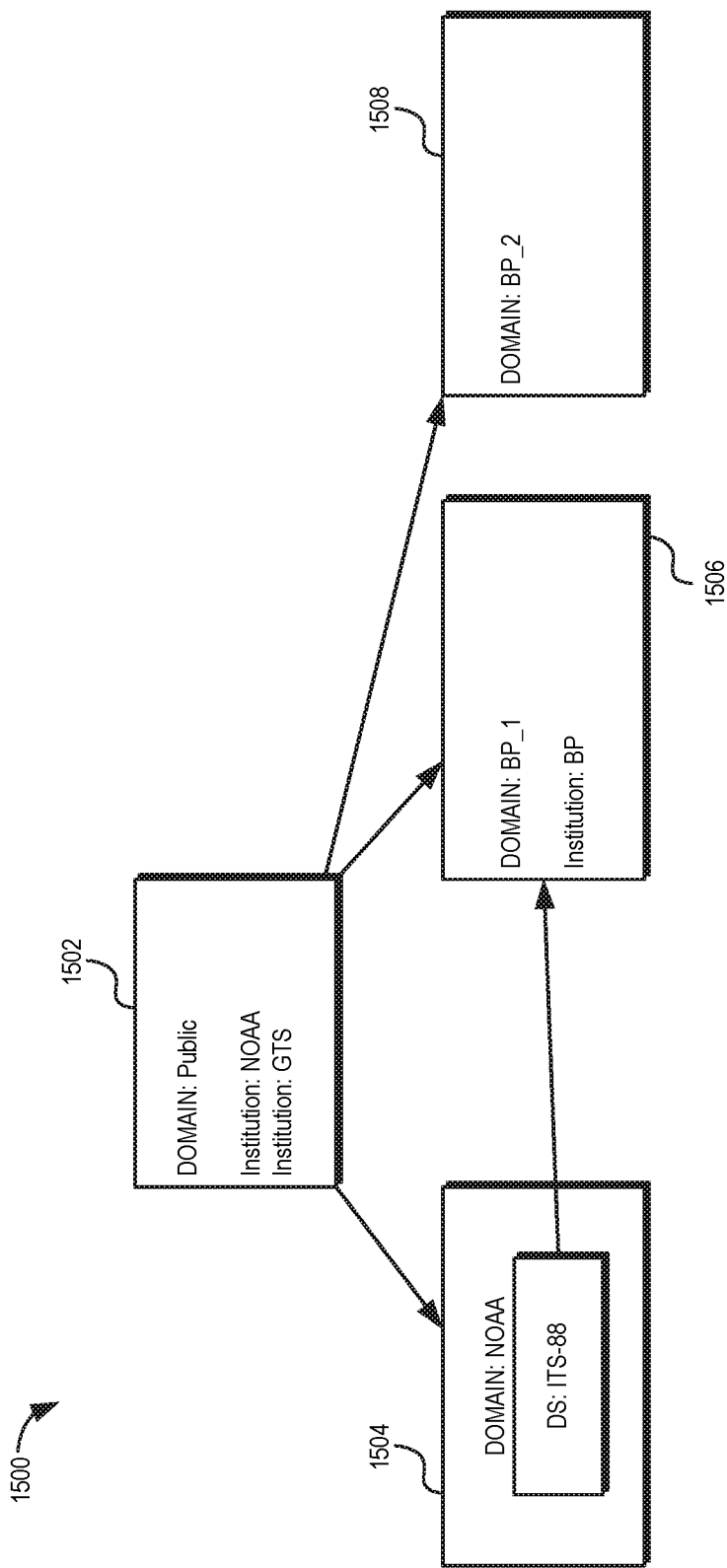
FIG. 15 illustrates an exemplary domain model that may be used in connection with embodiments of the systems and methods disclosed herein.

FIG. 15 illustrates an exemplary domain model 1500 that may be used in connection with embodiments of the systems and methods disclosed herein. The illustrated model 1500 has several domains 1502-1508. A public domain 1502 may contain public data and be associated with many institutions involved during public data import processes. Institutions, projects, data sources, measurements, etc., may have attached domain identifiers, and may be marked as a creator of associated data. In some embodiments, primary keys of entities may have associated domain identifiers to allow for interoperability.

A domain 1504 associated with NOAA may inherent certain public data (e.g., inherent the data without owning it—a domain identifier associated with the data may still remain public). In this manner, the domain may indicate there is an institution named NOAA that is created and managed by the public. In certain embodiments, the domain 1504 may create certain datasets (i.e. DS: ITS-88 in the illustrated embodiments) that are designated to allow for sharing with another domain 1506 associated with another entity (e.g., BP).

A large entity having multiple datacenters may have more than one domain. For example, as illustrated, BP may have two domains 1506 and 1508, each associated with a different datacenter and each having different domain identifiers. In some embodiments, data may be shared between domains using one or more URLs and/or associated private keys allowing access. Control of access to data, however, may be maintained by an originating domain and, accordingly, an originating domain may control the access and/or distribution of shared data.

Data Integration

Data collection from various sensors may involve multiple systems and organizations for processing data. Embodiments of the spatio-temporal data platform disclosed herein may be integrated with one or more of the systems and/or organizations involved. In some embodiments, the integration may be implemented as a mechanism that pulls data from a source location (e.g., a URL in the web) and/or a mechanism that receives data pushed into the platform using an interface (e.g., a REST API) available to the external organization or system. Prior to integration with the spatio-temporal data platform, the data may be compressed, filtered and/or processed to reduce the amount of data exchange involved. An example of such pre-processing may include identification of certain sounds based on measurements of acoustic data.

The process of integration may be influenced by mistakes and errors introduced by systems, people and/or organizations. Accordingly, in some embodiments, the data platform may be configured to revert, repeat, repair, and/or rebuild subsets of data collected previously. Such operations may be implemented in the data platform using any suitable method or methods including, for example, scheduled routines. To reduce the amount of errors and/or interdependencies, the platform may be implemented with loose coupling using, for example, a plugin architecture so that incidents or changes in individual datasets do not influence the entire system.

For handling the evolution of external parties, embodiments of the systems and methods disclosed herein may implement a mapping database that may be used for defining how incoming data maps to the data structure and definitions used by the platform. The mapping database may be implemented as a versioning system (e.g., a distributed revision control system). For reducing cascade effects from external errors or avoiding contamination of consistent data with inconsistencies, data staging processes may be used. In certain embodiments, data may be associated with one or more automatic or manual gates where approval must be acquired for further integration of the data with the platform processes. For example, an incoming dataset may be first stored in a different storage and integrated with the rest after a person has reviewed and documented consistency issues with the dataset.

In some embodiments, collected data may go through one or more transformations (e.g., transformation into a canonical data format) and/or evaluations of data consistency. Some transformations may store new values, distributions, statistics, data products in the platform for later reuse. An example of such transformation could be ranking of data consistency. The transforms may be conducted by sensors, systems associated with sensors, organizations owning or operating the systems, individuals or groups of people having access to the data, and/or any other suitable systems, organizations, and/or users. In some embodiments, the transformations may be conducted as the data arrives or separately based on a subset of data. The transformations may be stored as a model or an ensemble of models that provide an output based on receiving data as input. An example of such model(s) could be a model detecting outliers in the data and/or a model detecting specific sounds in acoustic data.

Data Collection

In some embodiments, a toolkit may be used in connection with collecting data from a large number of diverse data sources. In some embodiments, the toolkit may offer a declarative measurement type mapping for a data type, fast loopback on errors, utility libraries, and/or reusable and configurable collection plugins. Data collection may be implemented in a number of ways. For example, data collection may be implemented using a standalone collection toolkit with simple quality control and visualization. Data collection may further be extended to any solution that provides input data into the system including, for example, a data upload user interface where a user can define the contents of a data file.

In some embodiments, data collection may be implemented as a generic plugin-centric framework for data collection processes like data collection, data transformation, production of visualization and analytical products, calculation of data quality metrics, and/or any other data integration or processing. As discussed above, a data stream may comprise a sequence of data elements (i.e., segments) made available over time. A stream log may comprise a sequence of a certain type of data segments (e.g., point canonical segments or grid visualization segments or data quality segments) belonging to the same logical data stream. Each stream log may have a type identifier (e.g., "point.canonical", "grid.data", etc.). A data pipeline may comprise of plugins that listen to events (e.g., created data segments) from an inbound stream log and can create a new data segment into a configured outbound stream log.

Additional Applications of Spatio-Temporal Data Platform

In addition to the specific applications discussed above in connection with embodiments of the present disclosure, further embodiments of the spatio-temporal data platform disclosed herein may be used in connection with the prevention and reaction to water pollution, overfishing, and/or loss of habitat or species, although other suitable applications are also contemplated. Alternative uses may include, for example, planning and managing coastal infrastructure development, optimization of supply chain for goods transportation, conducing deep-sea drilling and mining operations, optimizing insurance premiums based on environmental conditions, and/or the like.

Datasets processed by the disclosed platform may include a combination of public and private data, where privacy of data is achieved either by configuring communication/computing/storage infrastructure to allow access only to specific people and systems and/or encryption of data streams. An example of such a system may include a privately hosted computing center receiving data via a secure encrypted satellite link. The platform may rely on one or more computing centers spread into different locations in space-time with data exchanged between the computing centers using data protocols supporting spatio-temporal data.

Further embodiments may be utilized in connection with monetizing private data and/or expert data packages. For example, a company may list their private datasets for sale and/or rent devices like ships, satellites, platforms and sensors for specific data collection missions. Embodiments of the disclosed data platform may help facilitate combining public and private content for optimal reuse of data collection efforts.

Example usage areas of disclosed embodiments could be in connection with control systems, decision support systems, and/or any other activity where data is input for decisions. An example could be insight gathered from satellites on active oil rigs, construction sites, tanker, survey ship and pipeline construction activities on Earth for real market conditions and trends.

Certain embodiments may be utilized in connection with more constrained sets of data types. For example, sonar data could be a focus of a platform in connection with both active sonar and passive sonar devices. In active sonar, an acoustic signal may be emitted, and the analysis may be performed on the received acoustic signal that results. The receiver may be collocated with or near the emitter, detecting reflections of the original signal; at some distance, collecting directly transmitted signal that may be delayed or distorted; or at some distance, collecting signals that have been reflected and/or refracted through many marine and geological structures.

The results of the measurements can be collected into the platform as described above. In further embodiments, such sonar devices could be used for collecting with seismic and oceanic data. For example, bathymetry data may be in gridded form and may be stored in addition with preview thumbnails of the bathymetry. Alternative examples of a data format like SEG Y containing high resolution bathymetry data from a survey mission could be converted to bathymetric data or image (e.g., PNG) and represented in a visual explorer. Similarly, sidescan images from sonars and habitat/sea floor composition data collected with sonars may be stored using a generic "x/y/value" collection plugin and be overlaid in a visual explorer interface with bathymetry data for comparison of habitat to the seabed. An additional example could be processing of seismic profile data in the system to combine numerous oil and gas exploration and production datasets using disclosed embodiments.

Yet another example may be in connection with the use of acoustic data streams to bring together information relating to recorded ambient noises (e.g., wind, animal communication, cars or any other sound) of industrial activities (e.g., ships, military operations, sonar surveys, airgun arrays, ports, oil rigs) and/or sound sources (e.g., storm cells, clusters of animals). Using the embodiments described above, original data streams may be cleaned and processed for known patterns and outliers that can be used operationally or referred to during environmental impact assessments.

By integrating diverse data sets, embodiments of the systems and methods disclosed here may be utilized in connection with be cleaning data to remove outliers and/or unreliable data points. For example, if a data point differs by a certain degree/threshold from similarly situated data points (e.g., temporally and spatially similar data points), such a data point may not be utilized in analytical modeling or graphical visualizations based on its potential unreliability. Utilizing the disclosed embodiments in connection with a diverse range of data sets may allow for better identification and removal of unreliable or outlier data points, thereby improving the accuracy of analytical models and graphical visualizations.

As discussed herein, a variety of metadata may be associated with a data set and/or its constituent data points. Certain users may place an importance on such metadata in determining the reliability of models and/or visualizations generated based on the data set. For example, an organization associated with a data set, a maintenance schedule/frequency associated with sensors generating the data sets, and a variety of other data set metadata information may be important to user in making decisions based on analyses derived from such data sets. Consistent with embodiments disclosed herein, models and visualizations may be customized based on filtering metadata associated with underlying data sets. Similarly, a user may have the ability to generate custom models and/or visualizations based on assigned weights assigned to metadata associated with data sets (e.g., a user may wish to place an increased importance to data obtained by a frequently maintained sensor and have such importance reflected in generated models and/or visualizations).

Figure 16:
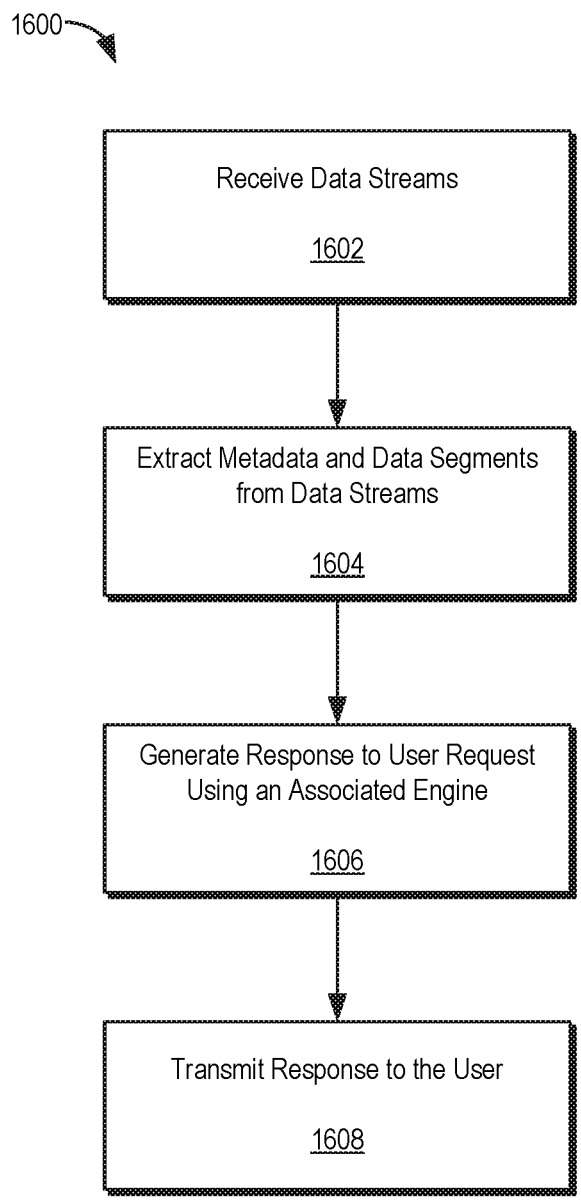
FIG. 16 illustrates a flow chart of an exemplary method of processing spatio-temporal data consistent with embodiments of the present disclosure.

FIG. 16 illustrates a flow chart of an exemplary method 1600 of processing spatio-temporal data consistent with embodiments of the present disclosure. In some embodiments, the illustrated method 1600 may be associated with the exemplary flow of data discussed above in connection with FIG. 6. At 1602, a plurality of data streams associated with a plurality of diverse distributed data sources may be received at a computer system. The plurality of data streams may comprise spatio-temporal data having a spatial component and/or a temporal component and may be provided by a variety of data sources, including any of the data sources detailed herein.

At 1604, a plurality of metadata segments and/or a plurality of spatio-temporal data segments may be extracted from the data streams. In some embodiments, the extraction at 1604 may include generating a plurality of intermediate (e.g., canonical) intermediate data segments derived from the data streams using one or more collection plugins. In certain embodiments, plugins architecture may utilize transformation information included in at least one transformation library in generating the intermediate data segments. Based on the intermediate data segments, the plurality of metadata segments and/or the plurality of measurement segments may be extracted.

At 1606, a response to a user request may be generated using a service engine based on the extracted metadata segments and measurement segments. In some embodiments, the response may be a visualization, a model, a statistical analysis and/or metric, and/or any desired other analytical and/or visual response derived from the extracted segments. At 1608, the response may be transmitted to a system associated with the requested user.

Figure 17:
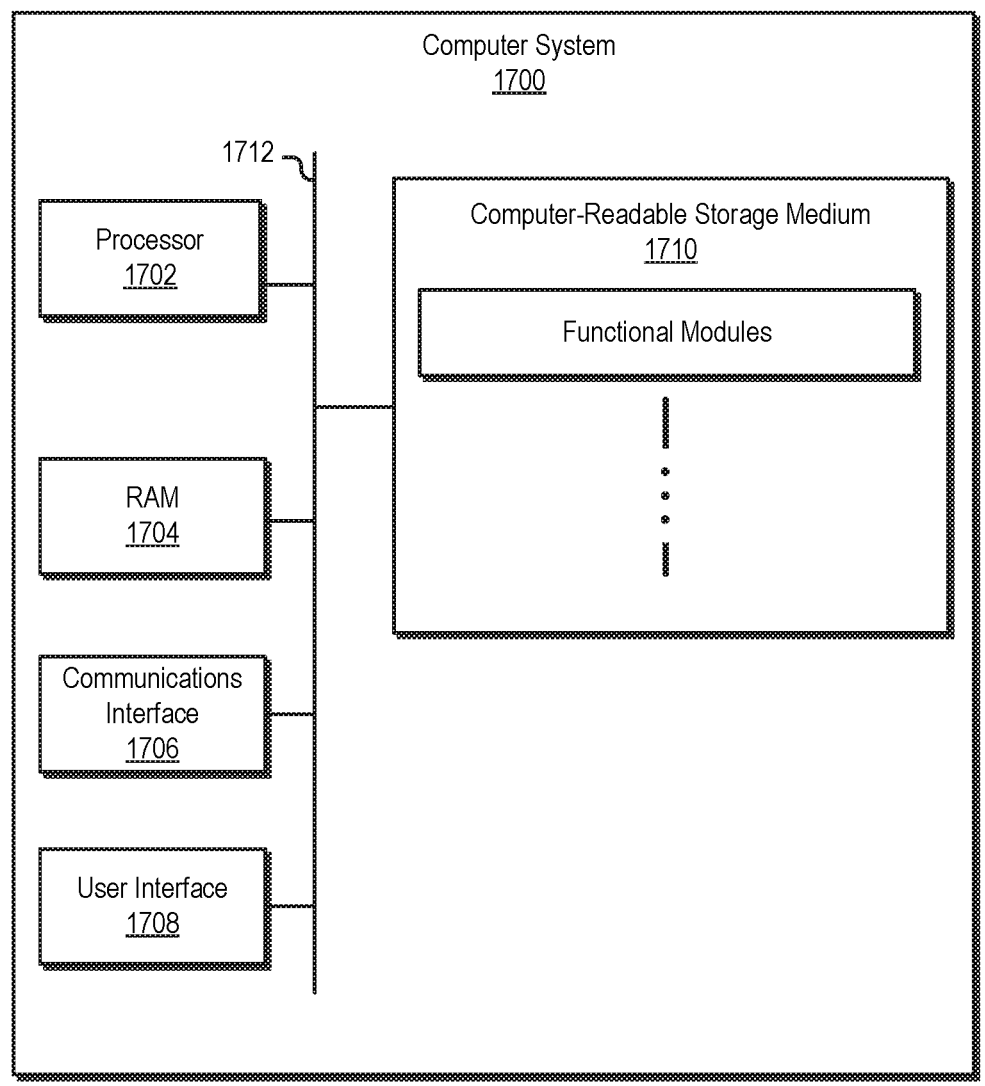
FIG. 17 illustrates an exemplary system that may be used to implement embodiments of the systems and methods of the present disclosure.

FIG. 17 illustrates a block diagram of an exemplary computer system 1700 for implementing certain embodiments of the systems and methods disclosed herein. In certain embodiments, the computer system 1700 may comprise a data collection system, a data storage system, a service system, a user system, and/or any other related system and/or systems. In certain embodiments, the computer system 1700 may be a personal computer system, a server computer system, and/or any other type of system suitable for implementing the disclosed systems and methods. In further embodiments, the computer system 1700 may be any portable electronic computer system or electronic device including, for example, a notebook computer, a smartphone, and/or a tablet computer.

As illustrated, the computer system 1700 may include, among other things, one or more processors 1702, random access memories ("RAM") 1704, communications interfaces 1706, user interfaces 1708, and/or non-transitory computer-readable storage mediums 1710. The processor 1702, RAM 1704, communications interface 1706, user interface 1708, and computer-readable storage medium 1710 may be communicatively coupled to each other via a data bus 1712. In some embodiments, the various components of the computer system 1700 may be implemented using hardware, software, firmware, and/or any combination thereof.

The user interface 1708 may include any number of devices allowing a user to interact with the computer system 1700. For example, user interface 1708 may be used to display an interactive interface to a user, including any of the visual interfaces disclosed herein. The user interface 1708 may be a separate interface system communicatively coupled with the computer system 1700 or, alternatively, may be an integrated system such as a display interface for a laptop or other similar device. In certain embodiments, the user interface 1708 may comprise a touch screen display.

The user interface 1708 may also include any number of other input devices including, for example, keyboard, trackball, and/or pointer devices.

The communications interface 1706 may be any interface capable of communicating with other computer systems and/or other equipment (e.g., remote network equipment) communicatively coupled to computer system 1700. For example, the communications interface 1706 may allow the computer system 1700 to communicate with other computer systems (e.g., computer systems associated with external databases and/or the Internet), allowing for the transfer as well as reception of data from such systems. The communications interface 1706 may include, among other things, a modem, an Ethernet card, and/or any other suitable device that enables the computer system 1700 to connect to databases and networks, such as LANs, MANs, WANs and the Internet.

The processor 1702 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein. The processor 1702 may be configured to execute computer-readable instructions stored on the non-transitory computer-readable storage medium 1710. Computer-readable storage medium 1710 may store other data or information as desired. In some embodiments, the computer-readable instructions may include computer executable functional modules. For example, the computer-readable instructions may include one or more functional modules configured to implement all or part of the functionality of the systems and methods described above.

It will be appreciated that embodiments of the system and methods described herein can be made independent of the programming language used created the computer-readable instructions and/or any operating system operating on the computer system 1700. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 1700 may be in response to user commands, results of previous processing, or a request made by another processing machine. It will be appreciated that computer system 1700 may utilize any suitable operating system including, for example, Unix, DOS, Android, Symbian, Windows, iOS, OSX, Linux, and/or the like.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of processing spatio-temporal data performed by a system comprising a processor and a non-transitory computer-readable storage medium storing instructions that, when executed, cause the system to perform the method, the method comprising:

receiving first data stream information associated with at least one distributed data source, the first data stream information comprising first data having a spatial component and a temporal component;

transforming the first data stream information into at least one first data entry in a data array, the data array including a plurality of spatial dimensions and at least one temporal dimension;

receiving, by a service engine executing on the system, a user request from a user system relating to the at least one distributed data source;

determining at least one of an amount of data the user system is capable of receiving and an amount of data the user system is capable of displaying;

generating, using the service engine, a first response to the user request based on the determination, the first response being based on the at least one first data entry; and transmitting the first response to the user system.

2. The method of claim 1, wherein the data array includes at least three spatial dimensions.

3. The method of claim 1, wherein the method further comprises:

extracting first metadata included in the first data stream information and associating the first metadata with the at least one first data entry in the data array.

4. The method of claim 3, wherein the first metadata comprises aggregated information associated with the first data stream information.

5. The method of claim 1, wherein the first data stream information comprises first measured data information.

6. The method of claim 1, wherein the first data stream information comprises first modeled data information.

7. The method of claim 1, wherein the first response comprises a visualization.

8. The method of claim 7, wherein the visualization is generated based on the at least one first data entry.

9. The method of claim 1, wherein the first response comprises a computation result from a predictive model based on the at least one first data entry.

10. The method of claim 1, wherein the first response comprises at least one first metric generated based on the at least one first data entry.

11. The method of claim 1, wherein determining at least one of the amount of data the user system is capable of receiving and the amount of data the user system is capable of displaying comprises determining the amount of data the user system is capable of displaying based, at least in part, on a visual interface associated with the user system.

12. The method of claim 1, wherein determining at least one of the amount of data the user system is capable of receiving and the amount of data the user system is capable of displaying comprises determining the amount of data the user system is capable of receiving based, at least in part, on a determined bandwidth of a communication channel between the system and the user system.

13. The method of claim 1, wherein determining at least one of the amount of data the user system is capable of receiving and the amount of data the user system is capable of displaying comprises determining the amount of data the user system is capable of receiving based, at least in part, on a determined latency of a communication channel between the system and the user system.

14. The method of claim 1, wherein generating the first response to the user request comprises transforming the at least one first data entry.

15. The method of claim 1, wherein generating the first response to the user request comprises performing at least one computation using the at least one first data entry.

16. The method of claim 15, wherein performing the at least one computation comprises performing the at least one computation using the at least one first data entry and at least one second data entry in the data array.

* * * * *